United States Patent
DeSouter et al.

(10) Patent No.: US 9,021,303 B1
(45) Date of Patent: Apr. 28, 2015

(54) MULTI-THREADED IN-MEMORY PROCESSING OF A TRANSACTION LOG FOR CONCURRENT ACCESS TO DATA DURING LOG REPLAY

(71) Applicant: EMC Corporation, Hopkinton, MA (US)

(72) Inventors: Marc A. DeSouter, Wayne, NJ (US);
Pranit Sethi, Somerset, NJ (US);
Morgan Clark, South Orange, NJ (US);
Jean-Pierre Bono, Westboro, MA (US);
Sairam Veeraswamy, Coimbatore (IN);
Peter C. Bixby, Westborough, MA (US);
Philippe Armangau, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 93 days.

(21) Appl. No.: 13/753,239

(22) Filed: Jan. 29, 2013

Related U.S. Application Data

(63) Continuation-in-part of application No. 13/625,292, filed on Sep. 24, 2012.

(51) Int. Cl.
*G06F 11/00* (2006.01)
*G06F 11/14* (2006.01)
(52) U.S. Cl.
CPC .................................. *G06F 11/1458* (2013.01)
(58) Field of Classification Search
USPC ......................................... 714/15, 16, 19, 20
See application file for complete search history.

(56) References Cited

U.S. PATENT DOCUMENTS

| | | | |
|---|---|---|---|
| 5,333,303 A * | 7/1994 | Mohan | 714/20 |
| 5,765,151 A | 6/1998 | Senator | |
| 6,535,949 B1 | 3/2003 | Parker | |
| 6,895,529 B2 * | 5/2005 | Egolf et al. | 714/15 |
| 7,076,509 B1 | 7/2006 | Chen et al. | |
| 7,178,145 B2 | 2/2007 | Bono | |
| 7,356,657 B2 | 4/2008 | Mikami | |
| 7,373,364 B1 | 5/2008 | Chapman | |
| 7,529,887 B1 | 5/2009 | Haase et al. | |
| 7,631,009 B1 | 12/2009 | Patel et al. | |

(Continued)

OTHER PUBLICATIONS

Uresh Vahalia et al., "Metadata Logging in an NFS Server," USENIX 1995, New Orleans, LA, Jan. 16-20, 1995, 12 pages, the USENIX Association, Berkeley, CA.

(Continued)

*Primary Examiner* — Joshua P Lottich
(74) *Attorney, Agent, or Firm* — Deepika Bhayana; Jason A. Reyes; Krishnendu Gupta

(57) ABSTRACT

A dataset is recovered after a server reboot while clients access the dataset. In response to the reboot, not-yet-completed transactions in a log are parsed to create, for each of the dataset blocks modified by these active transactions, a respective block replay list of the active transactions that modify the block. Once the block replay lists have been created, clients may access specified blocks of the dataset after on-demand recovery of the specified blocks. The on-demand recovery is concurrent with a background recovery task that replays the replay lists. To accelerate log space recovery, the parsing of the log inserts each replay list into a first-in first-out queue serviced by multiple replay threads. The queue can also be used as the cache writeback queue, so that the cache index is used for lookup of the replay list and the recovery state of a given block.

20 Claims, 21 Drawing Sheets

(56) References Cited

U.S. PATENT DOCUMENTS

| | | | |
|---|---|---|---|
| 7,631,071 B2* | 12/2009 | Cabrera et al. | 709/224 |
| 7,694,191 B1 | 4/2010 | Bono et al. | |
| 7,840,595 B1 | 11/2010 | Blitzer et al. | |
| 7,865,485 B2 | 1/2011 | Mullick et al. | |
| 7,882,386 B1 | 2/2011 | Potnis et al. | |
| 8,037,345 B1 | 10/2011 | Iyer et al. | |
| 8,161,236 B1 | 4/2012 | Noveck et al. | |
| 8,171,257 B2 | 5/2012 | Lewis | |
| 8,180,973 B1 | 5/2012 | Armangau et al. | |
| 8,244,903 B2 | 8/2012 | Bono | |
| 8,285,967 B1 | 10/2012 | Veeraswamy et al. | |
| 8,326,816 B2* | 12/2012 | Colle et al. | 707/705 |
| 2004/0103123 A1 | 5/2004 | Bradshaw | |
| 2004/0210796 A1 | 10/2004 | Largman et al. | |

OTHER PUBLICATIONS

Uresh Vahalia, "Unix Internals—The New Frontiers," pp. 187-219, 220-290, 338-371, Prentice-Hall, Inc., Upper Saddle River, NJ (1996).

"System Administration Guide: Devices and File Systems, UFS Logging," 2010, two pages, Sun Microsystems, Inc., Santa Clara, CA.

"Celerra File Server Architecture for High Availability," Aug. 1999, 11 pages, EMC Corporation, Hopkinton, MA.

John Ousterhout et al., "Beating the I/O Bottleneck: A Case for Log-Structured File Systems," Operating Systems Review, vol. 23, No. 1, Jan. 1989, pp. 11-28, Association for Computing Machinery, New York, NY.

Fred Douglis et al., "Log-Structured File Systems," COMPCON 89, San Francisco, CA, Feb. 27-Mar. 3, 1989, pp. 124-129, IEEE, New York, NY.

Gregory Ganger et al., "Soft Updates: A Solution to the Meta-data Update Problem in File Systems," ACM Transactions on Computer Systems, vol. 18, No. 2, pp. 127-153, May 2000, Association for Computing Machinery, New York, NY.

Juan I. Santos Florido, Journal File Systems, Linux Gazette, Jul. 2000, Issue 55, 11 pages, Linux Journal, Seattle, WA.

Mendle Rosenblum et al., "The Design and Implementation of a Log-Structured File System," ACM Transactions on Computer Systems, vol. 10, No. 1, Feb. 1992, pp. 26-52, Association for Computing Machinery, New York, NY.

Adam Moody et al., "Design, modeling, and evaluation of a scalable multi-level checkpointing system," 2010 ACM/IEEE International Conference for High Performance Computing, Networking, Storage and Analysis (SC10), New Orleans, LA, Nov. 13-19, 2010, pp. 1-11, IEEE, New York, NY.

M. Morioka et al., Design and Evaluation of the High Performance Multi-Processor Server, VLSI in Computers and Processors, Cambridge, Mass., Oct. 10-12, 1994, pp. 66-69, IEEE Computer Society Press, Los Alamitos, CA.

Building Cutting-Edge Server Applications, White Paper, 2002, 10 pages, Intel Corporation, Santa Clara, CA.

Intel Pentium 4 and Intel Xeon Processor Optimization, Reference Manual, 2002, 35 pages, Intel Corporation, Santa Clara, CA.

Threading Tools, web page, downloaded Jul. 13, 2002, 6 pages, intel.com, Intel Corporation, Santa Clara, CA.

Ningning Zhu, "Data Versioning Systems," Research Proficiency Exam Report, ECSL Technical reports (TR-131), www.ecsl.cs.sunysb.edu/tech_reports.html, 33 pages, Feb. 2003, Computer Science Department, Stony Brook University, Stony Brook, NY.

* cited by examiner

| Transaction | Sub-transaction | Block Number |
|---|---|---|
| 70 – Block Write | | |
| | Inode Change | 4 |
| 71 - File Create | | |
| | Allocate Inode | 3 |
| | Inode Change to directory | 5 |
| | Directory Change | 195 |
| | Inode Change for file | 4 |
| 74 - Set File Length | | |
| | Inode Change | 4 |
| 75 - Block Write | | |
| | Allocate Block | 3 |
| | Inode Change | 5 |
| 76 - Rename | | |
| | Directory Change | 195 |
| | Directory Change | 195 |
| | Inode Change | 5 |
| | Inode Change | 4 |
| | Free Block | 3 |
| | Free Inode | 3 |
| 82 – Block Write | | |
| | Inode Change | 4 |
| 83 – Block Write | | |
| | Alloc Block | 8195 |
| | Indirect Block Change | 24576 |
| | Inode Change | 4 |
| 84 – Block Write | | |
| | Inode Change | 4 |

FIG. 3

MULTI-THREADED IN-MEMORY PROCESSING OF A TRANSACTION LOG FOR CONCURRENT ACCESS TO DATA DURING LOG REPLAY

RELATED APPLICATIONS

The present application is a continuation-in-part of U.S. patent application Ser. No. 13/625,292 filed Sep. 24, 2012, by Sairam Veeraswamy and Peter C. Bixby entitled Concurrent Access to Data During Replay of a Transaction Log, incorporated herein by reference.

FIELD OF THE INVENTION

The present invention relates to multi-threaded replay of a transaction log to recover a dataset in data storage upon reboot of a data processor.

BACKGROUND OF THE INVENTION

Many client applications and operating system programs use a transactional model to insure the consistency of a dataset in data storage. Changes to the dataset are captured in transactions. Each transaction is performed in such a way that in the event of a system failure, it is possible to complete all of the changes of the transaction so that the dataset is restored to a consistent state.

For example, a single transaction in an accounting application transfers a certain amount of money from a first account to a second account. This transaction debits the first account by the certain amount and credits the second account by the same amount. If a system failure occurs during the transfer, the dataset of the accounts can be left in an inconsistent state in which the accounts do not balance because the sum of the money in the two accounts has changed by the certain amount. In this case, the transactional model permits a recovery program to restore the dataset to a consistent state upon reboot of the system after the system failure.

Operating system programs such as file systems and database managers typically use the transactional model to restore a file system or a database to a consistent state upon reboot of a data processor after a system failure. In the case of a server, transaction logging is one widely-used method of using the transactional model. Transaction logging involves writing a record for each transaction to a transaction log in data storage before the writing of the changes of the transaction to the dataset in data storage, so that the transaction log can be used to restore the dataset to a consistent state after a system failure.

For example, a client application sends a transaction request to an operating system program, and the operating system program responds by writing a corresponding transaction record to the transaction log, and then returning an acknowledgement of completion of the transaction to the client application, and then beginning a task of writing the changes of the transaction to the dataset in storage. In this fashion, the use of the transaction log permits the processing of a next transaction to begin before the changes of a previous transaction are written to the dataset in storage. Latency of responding to the transaction request is reduced by writing the transaction record to the transaction log in data storage faster than the corresponding changes can be written to the dataset in data storage.

Upon reboot of the data processor after a system failure, the transaction log may include many records of transactions not-yet-completed by the time of the reboot. In this case, a recovery program replays all of these not-yet-completed transactions so that all of the changes of the not-yet-completed transactions are applied to the dataset. In this fashion, the dataset is restored to the consistent state requested by the last transaction request that was acknowledged as completed. Further details of the logging and replay process are described in Uresh Vahalia et al., Metadata Logging in an NFS Server, USENIX 1995, Jan. 16-20, 1995, New Orleans, La., 12 pages, the USENIX Association, Berkeley, Calif.

Presently a typical file server has a data processor including multiple core central processing units (CPUs) sharing a high-speed data cache. Such a data processor has the capability of concurrent multi-threaded data processing in which portions of multiple program code threads are executed simultaneously by different ones of the CPUs. In order to speed up the replay of a file system transaction log in such a file server, multi-threaded replay has been done upon segments of the active portion of the transaction log.

For concurrent multi-threaded replay of a transaction log from an EMC Corporation brand of Common Block File System (CBFS), EMC Corporation has used the following procedure in its file servers. First, the head and the tail of the transaction log are located. The head is the oldest not-yet-completed transaction in the log, and the tail is the newest not-yet-completed transaction in the log. Second, the portion of the log between the head and the tail is read into memory. This is the active portion of the log containing the not-yet-completed transactions to be replayed. Third, the transactions in each log segment are sorted according their file system block number order. Each log segment is a 64 K byte region of contiguous storage locations in the log. Each transaction modifies one or more file system blocks, so that each transaction from the transaction log has one respective record in memory for each of the file system blocks modified by the transaction. Therefore the sorting of the transactions in each segment by file system block number order creates, for each segment of the log, a group of lists of modifications upon file system blocks. Each list is a list of modifications upon a particular file system block modified by one or more transactions in the segment. Fourth, the sorted transactions are processed segment-by-segment by multiple threads. For each segment and for each file system block that is modified by any transaction in the segment, a particular thread is assigned the task of replaying each and every modification upon the file system block. Therefore the thread reads the file system block to obtain a data block, modifies the data block with each and every modification from the respective list of transaction records for the file system block, and then writes the modified data block back to the file system block. Once this is done for all of the transaction records for all of the segments, the replay has been completed so in a final step the recovered file system is mounted for client access.

SUMMARY OF THE INVENTION

It is desired to reduce the amount of time required to restore client access to a dataset when a data processor is rebooted after a system failure, such as a system crash, power failure, or hardware issue. Currently, all of the records of the not-yet-completed transactions in the transaction log are replayed before client access is restored to the dataset. While the replay is reasonably efficient, the time for the replay is in addition to time needed for other processing to reboot the operating system. The delay in restoring client access can lead to client timeouts and errors.

In accordance with one aspect, the invention provides a method of recovery of a dataset in response to reboot of a data processor of a data storage system. The data storage system has data storage storing the dataset and a log of records of transactions upon the dataset. The transactions upon the dataset include modifications upon data blocks of the dataset. The method includes the data processor executing computer instructions stored on non-transitory computer readable storage medium to perform the steps of: (a) parsing records in the log of transactions not-yet-completed by the time of the reboot in order to produce data structure identifying dependencies between the not-yet-completed transactions; and then (b) performing a background task of replay of the not-yet-completed transactions in order to recover the dataset, and concurrent with the background task of replay of the not-yet-completed transactions in order to recover the dataset, responding to a request from a client for access to a specified block of data in the dataset by performing on-demand recovery of the specified block and then performing client access to the recovered specified block, and the on-demand recovery of the specified block accessing the data structure identifying dependencies between the not-yet-completed transactions in order to recover the specified block.

In accordance with another aspect, the invention provides a method of recovery of a dataset in response to reboot of a data processor of a data storage system. The data storage system has data storage storing the dataset and a log of records of transactions upon the dataset. The transactions upon the dataset include modifications upon data blocks of the dataset. The method includes the data processor executing computer instructions stored on non-transitory computer readable storage medium to perform the steps of: (a) parsing records in the log of transactions not-yet-completed by the time of the reboot in order to create, for each of the data blocks modified by the not-yet-completed transactions, a respective block replay list of the not-yet-completed transactions that modify each of the data blocks, the respective block replay list having a time order sequence of the not-yet-completed transactions that modify each of the data blocks; and then (b) performing a background task of replay of the not-yet-completed transactions by replay of transactions on the block replay lists upon the respective blocks of the block replay lists, and concurrent with the background task of replay of the not-yet-completed transactions on the block replay lists upon the respective blocks of the block replay lists, responding to a request from a client for access to a specified block of data in the dataset by performing on-demand recovery of the specified block and then performing client access to the recovered specified block, and the on-demand recovery of the specified block accessing a respective block replay list for the specified block in order to replay the not-yet-completed transactions on the respective block replay list for the specified block upon the specified block. The parsing of records in the log of transactions not-yet-completed by the time of the reboot includes producing a first-in first-out (FIFO) queue of the block replay lists, so that the block replay lists appear in the FIFO queue in an order in which the respective blocks of the block replay lists are first modified by the not-yet-completed transactions in the transaction log. The background task of replay of the not-yet-completed transactions includes servicing the FIFO queue to replay the transactions on the block replay lists upon the respective blocks of the block replay lists. The servicing of the FIFO queue to replay transactions on the block replay lists upon the respective blocks of the block replay lists includes servicing the FIFO queue with a plurality of concurrently executed replay threads so that each of the concurrently executed replay threads replays transactions on a different respective one of the block replay lists on the FIFO queue. The FIFO queue is used as a writeback queue for a cache memory by inserting entries on the FIFO queue for new data blocks of client write requests upon the dataset and servicing the entries on the FIFO queue with at least one writeback thread for writeback of the new data blocks of the client write requests from the dataset cache to the dataset in the data storage. The method further includes storing, in a block index for the cache memory, block recovery state as well as cache memory state for each of the data blocks modified by the not-yet-completed transactions, and accessing the block index to find a specified one of the data blocks modified by the not-yet-completed transactions in the cache memory and to find the block replay list for the specified block and to find the FIFO queue entry for the specified block and to find the block recovery state and the cache state for the specified block. The parsing of records in the log of transactions not-yet-completed by the time of the reboot includes producing a set of sub-transactions for each of the not-yet-completed transactions, each of the sub-transactions specifying a modification to one of the data blocks of the dataset, and placing a corresponding entry for each of the sub-transactions on the replay list for the one of the data blocks of the dataset, and replay of transactions on each of the block replay lists includes execution of the sub-transactions on each of the block replay lists. The method further includes setting a respective log hold for each of the sub-transactions, and releasing the respective log hold for each of the sub-transactions after execution of each of the sub-transactions, and recovering log space of the not-yet-completed transactions in response to release of the log holds of the not-yet-completed transactions.

In accordance with still another aspect, the invention provides a data storage system. The data storage system includes data storage storing a dataset and a log of records of transactions upon the dataset. The transactions upon the dataset include modifications upon data blocks of the dataset. The data storage system further includes a data processor coupled to the data storage for providing a client with access to the dataset, and non-transitory computer readable storage medium coupled to the data processor and storing computer instructions. The computer instructions, when executed by the data processor, perform recovery of the dataset in response to reboot of the data processor by performing the steps of: (a) parsing records in the log of transactions not-yet-completed by the time of the reboot in order to produce data structure identifying dependencies between the not-yet-completed transactions; and then (b) performing a background task of replay of the not-yet-completed transactions in order to recover the dataset, and concurrent with the background task of replay of the not-yet-completed transactions in order to recover the dataset, responding to a request from a client for access to a specified block of data in the dataset by performing on-demand recovery of the specified block and then performing client access to the recovered specified block, and the on-demand recovery of the specified block accessing the data structure identifying dependencies between the not-yet-completed transactions in order to recover the specified block.

BRIEF DESCRIPTION OF THE DRAWINGS

Additional features and advantages of the invention will be described below with reference to the drawings, in which:

FIG. 3 shows a specific example of transactions and sub-transactions in records of a transaction log for the case of transactions upon a file in a file system;

Figure 1:
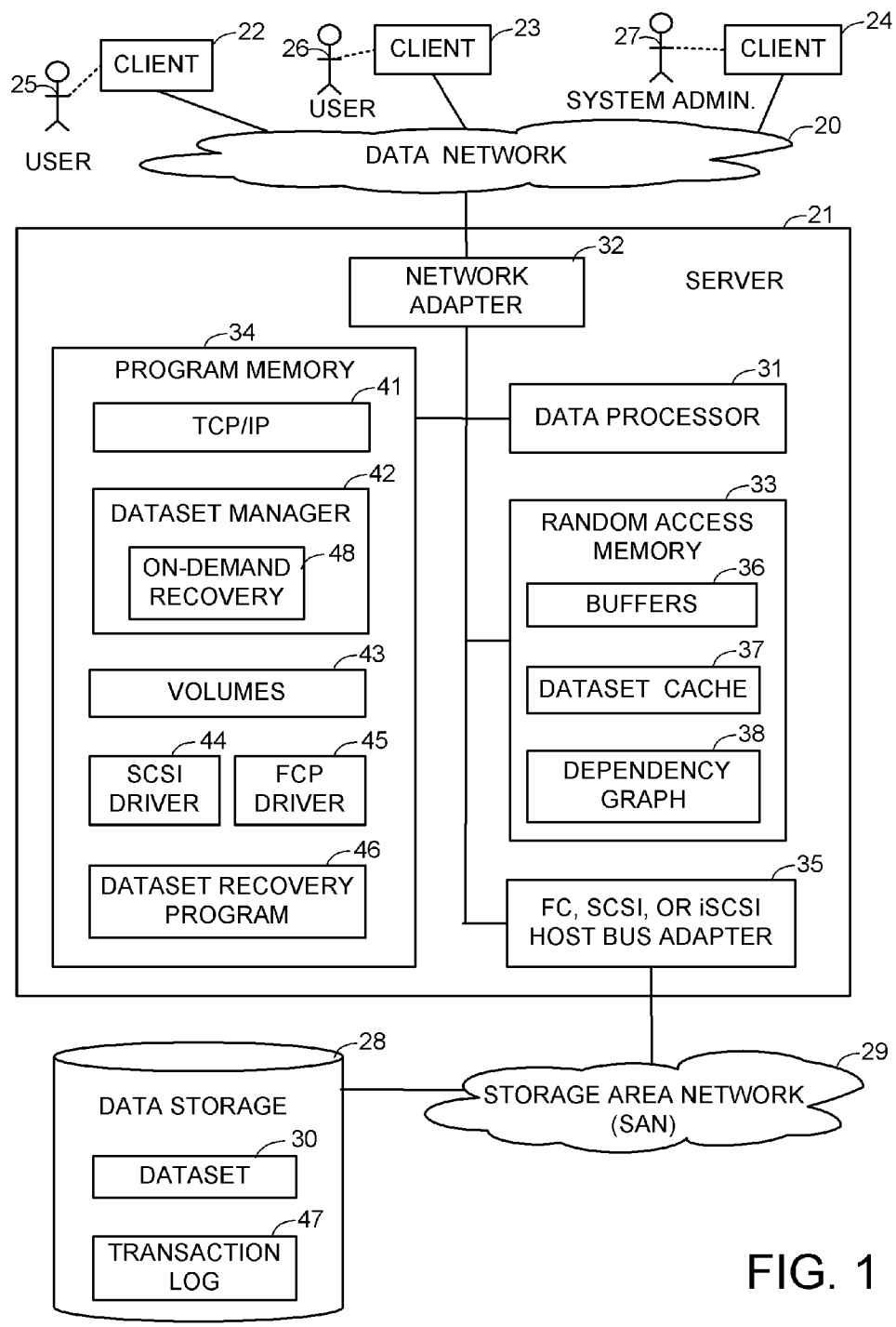
FIG. 1 is a block diagram of a data network including a data storage system.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

1. Transaction Logging in a Storage Server

With reference to FIG. 1, there is shown a data network 20 including a server 21 for servicing requests from network clients 22, 23, 24 for access to a dataset 30 in data storage 28. The network clients 22, 23, 24, for example, are workstations operated by respective human users 25, 26, 27. A storage area network (SAN) 29 links the data storage 28 to the server 21 to form a data storage system. The data storage 28, for example, is an array of disk drives.

The server 21 includes a data processor 31, a network adapter 32 linking the data processor to the data network 20, random access memory 33, program memory 34, and a Fibre-Channel (FC), Small Computer Systems Interface (SCSI), or Internet Protocol SCSI (iSCSI) host bus adapter 35 linking the data processor to the storage area network (SAN) 29. The data processor 31 is a general purpose digital computer data processor including one or more core central processing units (CPUs) for executing computer program instructions stored in the program memory 34. The program memory 34 is a non-transitory computer readable storage medium, such as electrically erasable and programmable read-only memory (EEPROM). The random access memory 33 includes buffers 36 and a dataset cache 37.

The program memory 34 includes a program layer 41 for network communication using the Transmission Control Protocol (TCP) and the Internet Protocol (IP). The program memory 34 also includes a dataset manager 42 for responding to client requests for access to the dataset 30, and a logical volumes layer 43 providing a logical volume upon which the dataset 30 is built. The logical volume is configured from the data storage 28. For example, the logical volume is configured from one or more logical unit numbers (LUNs) of the data storage 28, and the logical volumes layer 43 translates logical block numbers from the dataset manager 42 to the LUNs where the desired blocks of storage are found.

The logical volumes layer 43 is layered over a SCSI driver 44 and a Fibre-Channel protocol (FCP) driver 45 in order to access the logical unit numbers (LUNs) in the storage area network (SAN) 29. The data processor 31 sends storage access requests through the host bus adapter 35 using the SCSI protocol, the iSCSI protocol, or the Fibre-Channel protocol, depending on the particular protocol used by the storage area network (SAN) 29.

The dataset manager 42 uses a transaction log 47 to provide a way of restoring the dataset 30 to an up-to-date, correct, and consistent state after a system failure. When the dataset manager 42 receives a client request to perform a transaction upon the dataset 30, the dataset manager responds by writing a corresponding transaction record to the transaction log, and then returning an acknowledgement of completion of the transaction to the client, and then beginning a task of writing the changes of the transaction to the dataset in storage.

The writing of the transaction records to the transaction log 47 is significantly faster and more efficient than making changes to what could be many different and spatially dispersed data structures in the dataset 30 in the data storage 28. This advantage is due to a couple of factors: 1) writing in an append only fashion to the transaction log 47 is more efficient; 2) multiple changes may be included in a single log transaction, and 3) the atomicity of the transaction relieves the system from any need to order updates. In addition, write gathering techniques are used that allow a single write to the log to contain multiple transactions.

The server 21 also has a dataset cache 37 so that the task of writing the changes of the transaction to the dataset 30 in storage 28 can be done more efficiently in a delayed fashion while the dataset manager 42 services subsequent client requests by accessing the dataset cache. Therefore the dataset cache 37 works in combination with the transaction logging to reduce the latency in responding to the client requests while protecting the consistency of the dataset 30. The latency can be further reduced by storing the transaction log 47 in fast data storage such as solid-state disk or flash memory.

A cost of reducing the latency is that records of many not-yet-completed transactions become stored in the transaction log, which increases the time for recovery after a system failure. Upon reboot of the data processor 31 after a system failure, the dataset 30 could be restored to an up-to-date, correct, and consistent state by the conventional method of a sequential replay of all of the not-yet-completed transactions in the transaction log 47. In this conventional method of sequential replay, the clients are denied access to the dataset until the replay is finished, so that the clients will not access inconsistent data, and the replay will not write over and therefore obliterate any new changes from the clients.

2. Providing Concurrent Access to Data During Log Replay

It is desired to provide a way of recovering the dataset 30 upon reboot of the data processor 31 in which log replay is done after client access is restored to the dataset. Before client access is restored, a dataset recovery program 46 scans the records of the not-yet-completed transactions in the transaction log 47 to create a dependency graph 38 of dependencies between the not-yet-completed transactions. This allows the clients 22, 23, 24 to immediately access the dataset 30 once the dependency graph 38 has been created. This still achieves the goal of restoring the dataset 30 to a correct and consistent state.

So that the clients do not access inconsistent data when the dataset manager 42 receives a client request before the entire dataset is restored, the dataset manager has an on-demand recovery routine 48 for recovering each and every data block needed for servicing the client request. The on-demand recovery routine 48 searches the dependency graph 38 to determine which of the not-yet-completed transactions, if any, should be replayed before accessing a data block needed for servicing the client request.

So that the log replay will not write over any new change of the access for the client request, the dependency graph 38 also keeps track of the recovery state of each not-yet-completed transaction. Upon reaching any transaction record having a recovery state of "recovery in progress," a background task of sequential replay waits until the recovery state changes to "recovery completed" and then skips to the next transaction record in the log. Upon reaching any transaction record having a state of "recovery completed," the background task of sequential replay skips to the next transaction record in the log. In this fashion a transaction replayed by the on-demand recovery routine 48 is not replayed again after the access for the client request.

Figure 2:
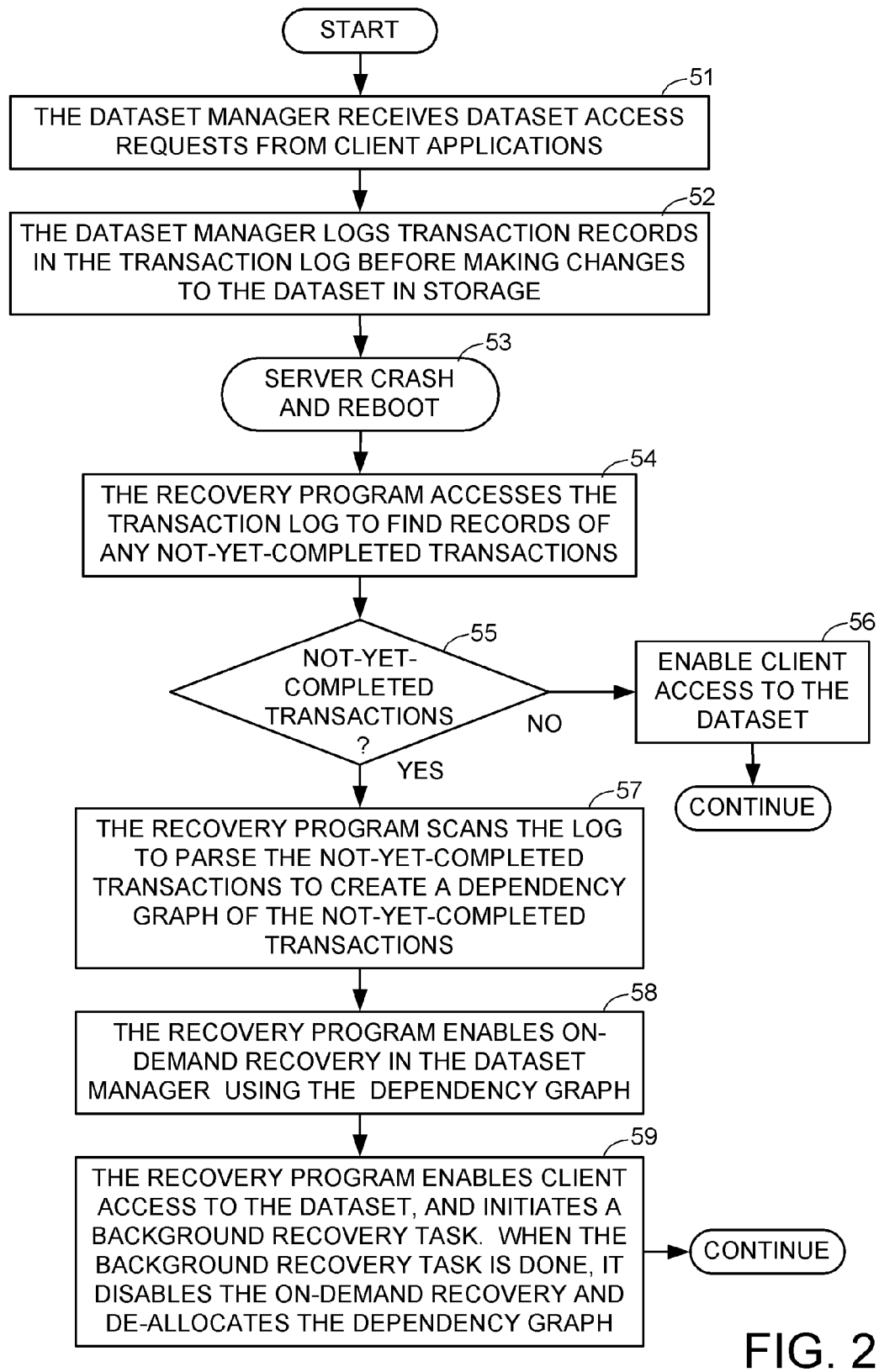
FIG. 2 is a flowchart of a method of recovery of the dataset in FIG. 1 in response to reboot of the data processor in FIG. 1.

FIG. 2 shows the overall process of transaction logging and recovery after a server crash and reboot. In a first step 51, the dataset manager receives dataset access requests from client applications. In step 52, the dataset manager logs transaction records in the transaction log before making changes to the dataset in storage. In step 53, the normal transaction logging process is interrupted by a server crash and reboot. In step 54, the recovery program is one of a number of programs that the operating system invokes after reboot and before enabling client access to the dataset. The recovery program first accesses the transaction log to find records of any not-yet-completed transactions.

In a conventional implementation, the transaction log is a circular log. In other words, a certain amount of contiguous storage is allocated to the log, and when the process of appending new transaction records reaches the end of this allocated storage, the process is repeated at the beginning of the allocated storage. Each transaction record has a sequence number or timestamp that is unique among all of the records in the log. Therefore a binary search of the sequence numbers or timestamps will locate the record most recently written to the log. This record most recently written to the log is known as the tail of the log.

The process of appending new transaction records to the log includes the dataset manager 42 receiving, from the data storage 28, confirmation that one or more transaction records have actually been written to the data storage. The dataset manager 42 keeps a record of the last transaction record confirmed as actually having been written to the transaction log in the data storage. The first record following this record of the last completed transaction is known as the head of the log. Just before writing each new transaction record to the log, the dataset manager inserts the transaction record number of the last completed transaction into the new transaction record.

In a conventional implementation, the log is also used to record a special transaction of closing the log. During proper shutdown of the server 21, the dataset manager 42 waits until confirmation has been received of all of transaction records written to the log. Then the dataset manager 42 writes a record of the special transaction of closing the log. In this case, in step 54, the records of the not-yet-completed transactions are found by finding the tail of the log, and then reading the record at the tail of the log to discover whether the log was properly closed and to discover the record of the last completed transaction. If the record at the tail of the log indicates the special transaction of closing the log, and the head of the log is the record at the tail of the log, then there are no uncompleted transactions and the dataset manager was properly shut down.

There are other ways that could be used to determine whether the transaction log was properly closed. For example, instead of writing a special transaction of closing the log to the tail of the log, the closing of a transaction log for a file system could include writing state information to the superblock of the file system. In this case, in step 54, the recovery program would access the state information in the superblock of the file system to determine whether the transaction log was properly closed. If so, then there would not be any not-yet-completed transactions in the transaction log.

If the log was properly closed, then execution branches from step 54 to step 55 to step 56 to enable client access to the dataset, and execution continues from step 56 to process client requests for access to the dataset in the usual fashion. Otherwise, in the usual case of a server crash, there are records of not-yet-completed transactions following the record of the last completed transaction up to and including the tail of the log, so that execution continues from step 55 to step 57.

In step 57, the recovery program scans the log to parse the records of the not-yet-completed transactions to create a dependency graph of the not-yet-completed transactions. Next, in step 58, the recovery program enables on-demand recovery (48 in FIG. 1) in the dataset manager (42 in FIG. 1), and this on-demand recovery uses the dependency graph. Then, in step 59, the recovery program enables client access to the dataset, and initiates a background recovery task. When the background recovery task is done, it disables the on-demand recovery and de-allocates the dependency graph.

After step 59, execution continues to process client requests for access to the dataset in the usual fashion, except that when the dataset manager processes each client request for access to a specified block of the dataset, this processing includes execution of an additional on-demand recovery routine (48 in FIG. 1) that recovers the specified block before the requested client access is performed upon the specified block. The on-demand recovery routine is executed for the processing of each client request for access to the dataset until the recovery of the background recovery task is done and the background recovery task disables the on-demand recovery routine.

FIG. 3 shows a specific example of transactions and sub-transactions in records of the transaction log 47 for the case of transactions upon a file in a file system. In this case, the dataset 30 is a UNIX-based file system, and the dataset manager 42 manages the UNIX-based file system is described in Uresh Vahalia, Unix Internals—The New Frontiers, Chapter 9, File System Implementations, pp. 261-290, Prentice-Hall, Inc., Upper Saddle River, N.J. (1996). Each transaction corresponds to a single file system access request received from a client or server application, such as a request for a block write to a specified file, a request to create a new file in a specified directory, a request to set the length of a specified file, and a request to rename a file. Each transaction includes a group of sub-transactions, and each sub-transaction writes data to a specified file system block. The transaction log includes, for each transaction record, the file system block number of each sub-transaction and the data written to this file system block for each sub-transaction. Replay of the transaction log record entails executing the write operations of the sub-transaction data to the sub-transaction blocks.

In general, any transaction requested by a client or server application can be logged as a series of sub-transactions in which each sub-transaction consists of a block number and information about what must be updated in that block. Then the recovery process can be performed by applying the updates in order from the oldest update to the newest update. The order is important because newer transactions may overwrite or invalidate older transactions.

For example, the dataset manager performs each requested transaction by reading any data for the transaction from the dataset 30 in the data storage and storing this data in the dataset cache, and then computing updates from this data, and writing the updates to the transaction log and to the dataset cache 37, and then scheduling the write-back of the updates from the cache 37 to the dataset 30 in the data storage.

A more specific example is the case introduced above of a financial application that transfers a certain amount of money "$X" from a first account to a second account. Suppose that the current balance "$ACCT1" of the first account is stored in "BLOCK_Y" of the dataset and the current balance "$ACCT2" of the second account is stored in "BLOCK_Z" of the dataset. The financial application requests a transaction of debiting the first account in "BLOCK_Y" by "$X" and crediting the second account in "BLOCK_Z" by "$X". The dataset manager performs this transaction by reading "$ACCT1" from "BLOCK_Y", reading "$ACCT2" from "BLOCK_Z", computing a new balance "$ACCT1−$X" for the first account, computing a new balance "$ACCT2+$X" for the second account, writing a record for the transaction to the log, and then scheduling the write-back of the new data to the dataset in the data storage. The log record for the transaction includes a first sub-transaction "$ACCT1−$X→BLOCK_Y" and a second sub-transaction "$ACCT2+$X→BLOCK_Z". Each sub-transaction therefore writes a specified constant update to a specified block of the dataset.

Sub-transactions in the form of writing a specified constant update to a specified block have the advantage that they are idempotent, meaning that they can be repeated any number of times without changing their result. Because the transactions are time ordered in the log and they are replayed only in the forward direction during recovery, the log recovery may be repeated any number of times if a system crash would occur during the recovery process. Such partial recoveries are totally transparent, as long as a full recovery is eventually completed. Such partial recoveries are likely if records of a large number of not-yet-completed transactions become stored in the log. The logging of idempotent sub-transactions eliminates the need for logging the replay of each transaction during log recovery, while newly executed transactions are logged in the regular fashion during the on-demand recover process.

A successful completion of the recovery process insures a consistent dataset state (barring hardware issues or software bugs). At that point the log may be discarded (i.e. cleaned and reused) and the dataset can be marked as fully recovered. If recovery cannot be completed by replaying the log, then the dataset must be "fixed up" by other means. For example, it may be possible for a file system to be "fixed up" by a file system checking ("fsck") utility. Fortunately, a failure of the log recovery process is an extremely rare occurrence.

The on-demand recovery process uses a dependency graph so that when a client or application requests access to a specified block of the dataset, the dependency graph is accessed to find any not-yet-completed transactions that should be completed before the specified block is accessed for the client or application request. For example, when a client or application requests access to a specified block of the dataset, any not-yet-completed transaction that modifies the specified block should be replayed before the specified block is accessed for the client or application request, and if there are more than one such not-yet-completed transaction, then these not-yet-completed transactions should be replayed in order, from oldest to youngest, before the specified block is accessed for the client or application request. However, any non-yet-completed transaction should not be replayed before any older not-yet-completed transaction unless the younger not-yet-completed transaction has no dependencies upon the older not-yet completed transaction. Therefore, the dependency graph is used to identify any and all dependencies among the not-yet-completed transactions.

Figure 4:
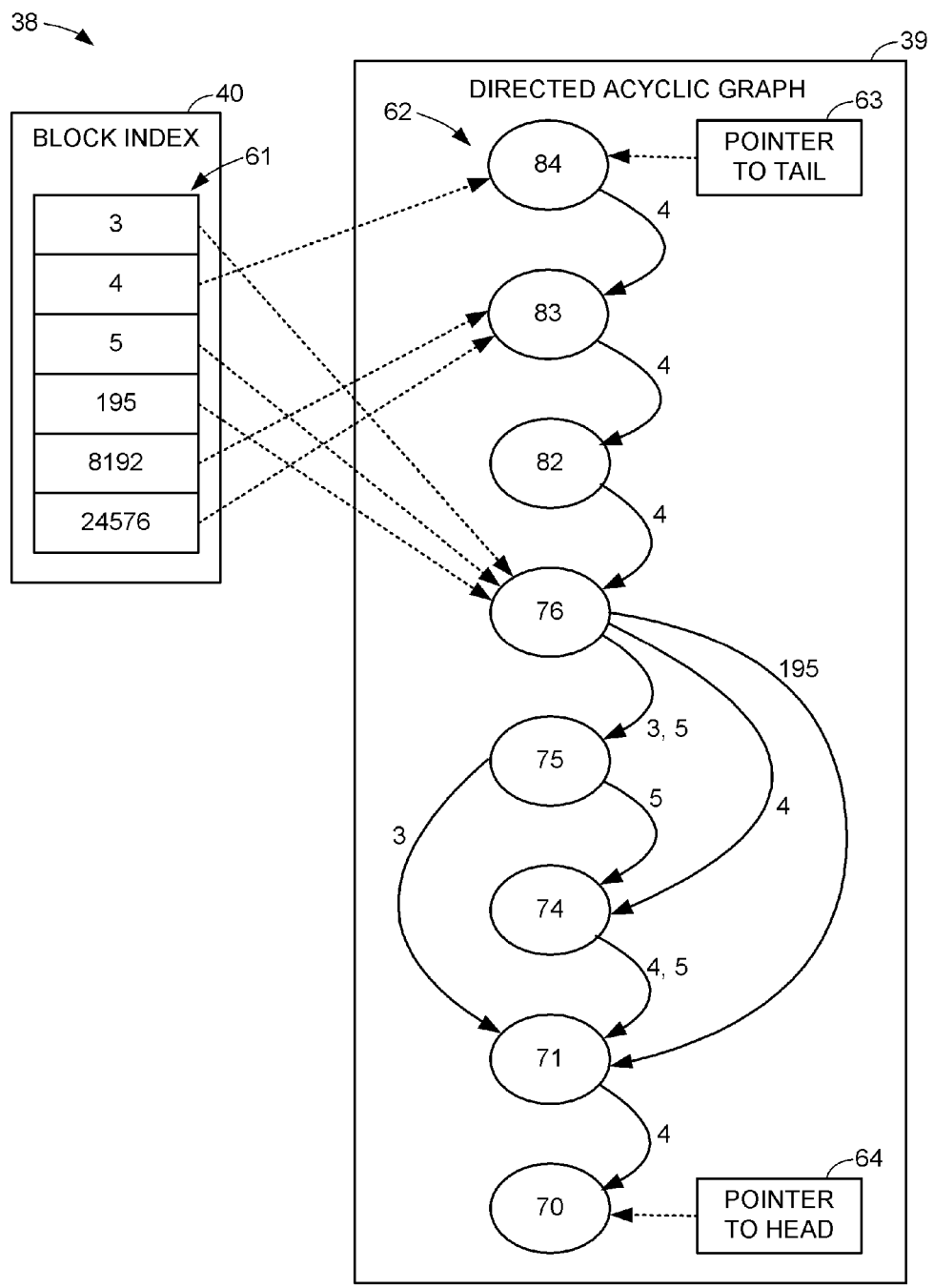
FIG. 4 is a block diagram of a dependency graph corresponding to the records of the transaction log of FIG. 3.

FIG. 4 shows an example of a specific format of a dependency graph 38 for the not-yet-completed transactions in the transaction log of FIG. 3. The dependency graph 38 includes a directed acyclic graph 39 having a time-ordered series of nodes 62 for the not-yet-completed transactions in the transaction log, so that each not-yet-completed transactions in the transaction log has a respective unique node (shown as an oval) in the directed acyclic graph 39. Therefore there is a one-to-one correspondence between each of the nodes and a corresponding one of the not-yet-completed transactions.

Each node in the directed acyclic graph 39 of FIG. 4 is labeled with a transaction record number indicating an offset or logical address where the transaction record begins in the transaction log. The directed acyclic graph 39 has a pointer 64 to the node corresponding to the transaction record at the head of the log, and a pointer 63 to the tail of the directed acyclic graph 39. When the construction of the directed acyclic graph has been completed, the pointer 63 points to the node corresponding to the transaction record at the tail of the log.

The time-ordering of the series of nodes 62 is done by allocating each node and linking each node into a list of nodes as the log record of each not-yet-completed transaction is scanned during the scanning process (of step 57 in FIG. 2). Thus, in addition to the edges shown in FIG. 4 for the dependencies between the nodes, there is a mechanism that orders the nodes for efficient scanning of the nodes in their time-ordered sequence from the head node (indicated by the pointer to head 64) to the tail node (indicated by the pointer to tail 63). This mechanism is used by the background recovery task (invoked in step 69 of FIG. 2) for replaying not-yet-completed transactions in their time-ordered sequence.

The dependencies between the nodes are indicated by edges, so that each edge points from the node of a dependent transaction to the node of another transaction from which it depends. In FIG. 4, each edge is labeled with a list of block numbers of blocks that give rise to the dependency between the dependent node from which the edge originates to the supporting node to which the arrow of the edge is pointing. For the case in which each transaction has sub-transactions, and each sub-transaction updates a specified block, then for any specified block, the node of the transaction has at least one edge labeled in FIG. 4 with the number of the specified block so long as there is at least one node of an earlier transaction that specified the same block. In a specific implementation, if there is more than one such node of an earlier transaction that specified the same block, then there is only one edge labeled with the number of the specified block, and this edge points to the most recent node of an earlier transaction that specified the same block. More than one such edge is not needed because nodes of any earlier transactions that specified the same block will be found during a depth-first search of the directed acyclic graph.

For efficient operation of the on-demand recovery routine (48 in FIG. 1), the dependency graph 38 has an associated block index 40 for finding a node of the most recent not-yet-completed transaction that modifies a specified block. The block index 40 includes entries 61 storing block numbers of the blocks modified by the not-yet-completed transactions, and for each such block, the entry includes a pointer to the node of the most recent not-yet-completed transaction that modifies the specified block.

Figure 5:
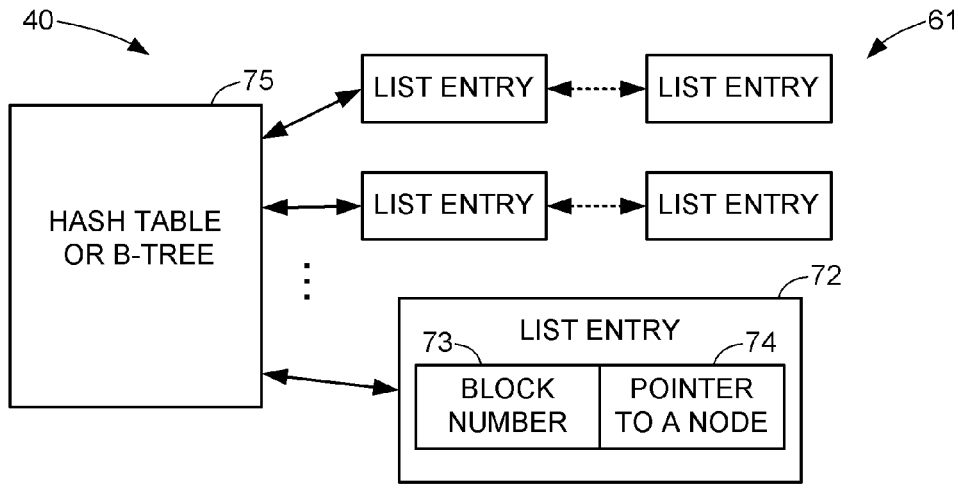
FIG. 5 is a block diagram showing further details of a block index introduced in FIG. 4.

FIG. 5 shows further details of the block index 40. The entries of the block index are entries of one or more doubly-linked lists 61. Each list entry 72 includes a block number field 72 and a field 74 for an associated pointer to a node. The lists 61 are linked together by a hash table or B-tree 75. For example, if the dataset manager uses a hash table index for indexing the dataset to find a specified block in the dataset, then the block index 40 may use a hash table and a similar indexing routine for finding a node associated with a specified block. If the dataset manager uses a B-tree for indexing the dataset to find a specified block, then the block index 40 may use a B-tree and a similar indexing routine for finding a node associated with a specified block.

Figure 6:
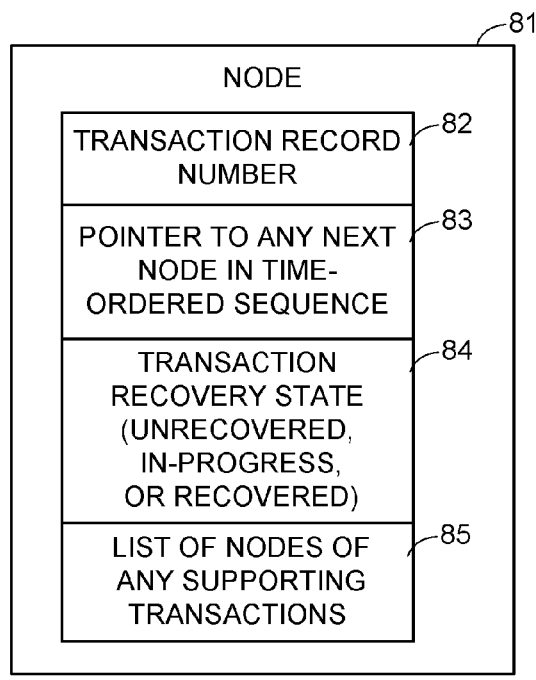
FIG. 6 is a block diagram of one of the nodes in a directed acyclic graph introduced in FIG. 4.

FIG. 6 shows further details of a node 81 in the directed acyclic graph (39 in FIG. 4). The node 81 includes a field 82 for the transaction record number corresponding to the node, a field 83 for a pointer to any next node in the time-ordered sequence of the transactions of the nodes, a field 84 for a transaction recovery state, and a field 85 for a list of nodes of any supporting transactions.

In order to allow the on-demand recovery routine and the background recovery task to be executed concurrently, each transaction in the dependency graph has a recovery state variable. The state may be: "unrecovered," "in-progress," or "recovered." A "recovered" state indicates that recovery of the transaction and all of its associated supporting transactions has been completed. An "in-progress" state indicates that another task has already begun the recovery so that the present task should wait for that recovery to complete. Finally, an "unrecovered" state indicates that this transaction, and any and all not-yet-recovered transactions upon which it depends, need to be recovered.

Performing the task of on-demand recovery and client access concurrent with the background task of replay means that the two tasks are performed over the same interval of time. Therefore the two concurrent tasks can be performed in parallel, or nearly simultaneously by time-interleaved operations. For example, the two tasks could be performed in parallel by a data processor having multiple CPU cores, in which one CPU core could execute the background task of replay while another CPU core could execute the on-demand recovery and then the client access to the dataset. The two tasks could be performed nearly simultaneously by time interleaved operations by a data processor having a single CPU core, in which a task scheduler interrupts the background task of replay temporarily to perform the on-demand recovery on a priority basis, and then the task scheduler resumes the background task of replay once the on-demand recovery and the client access to the dataset has been completed.

Client or server applications may take a variety of locks upon the dataset to control access and maintain dataset consistency. Because the dataset manager performs the on-demand recovery process as part of the block read from disk, there is no need to modify the lock management to accommodate the on-demand recovery process. The on-demand recovery process is completed for the read operation before the read data is returned to the client or server application, so that the client or server application sees only the recovered version of the block.

Figure 7:
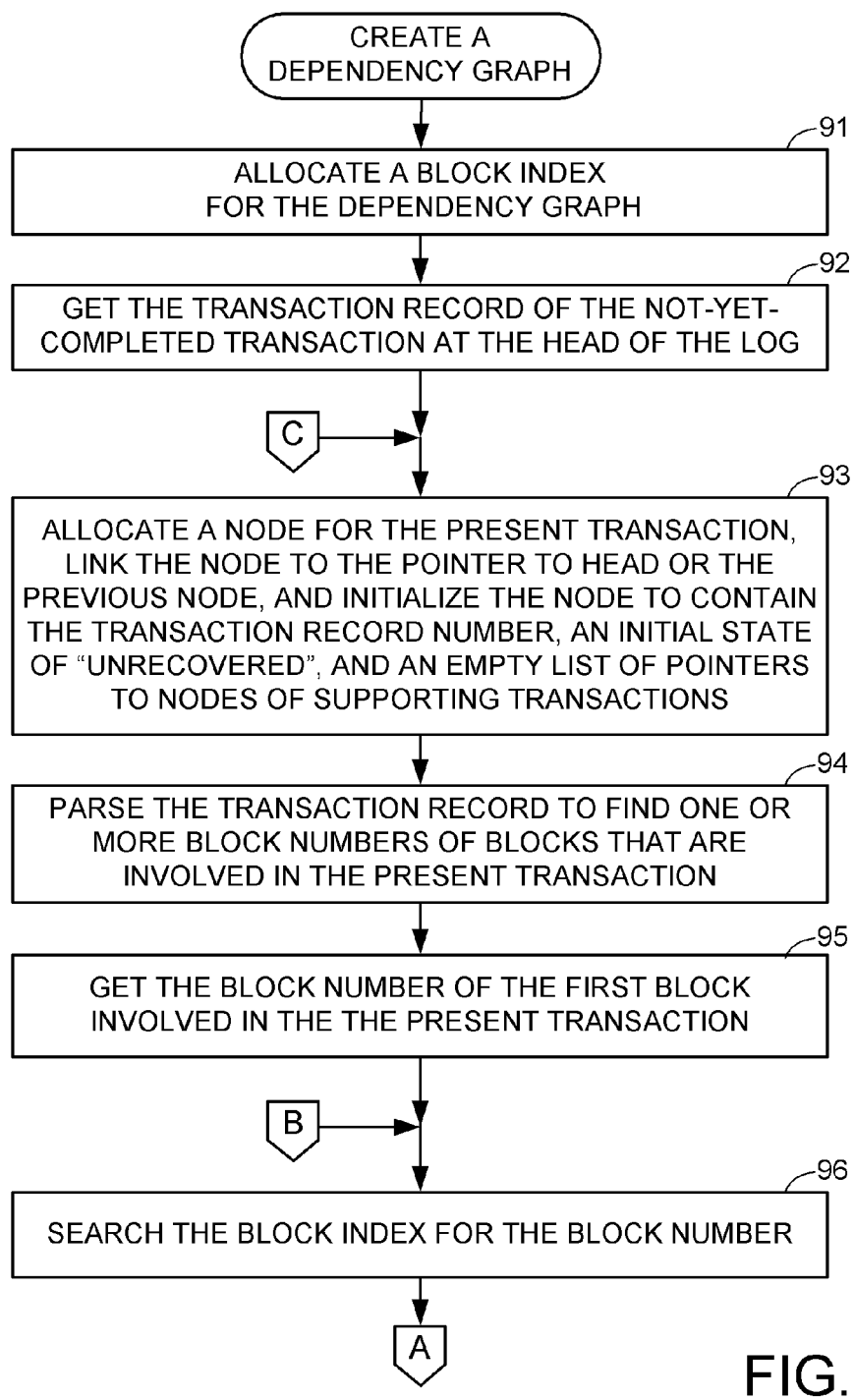
FIGS. 7 and 8 together comprise a flowchart of a subroutine in the dataset recovery program in FIG. 1 for creating the dependency graph by scanning the transaction log to parse records of not-yet-completed transactions.
Figure 8:
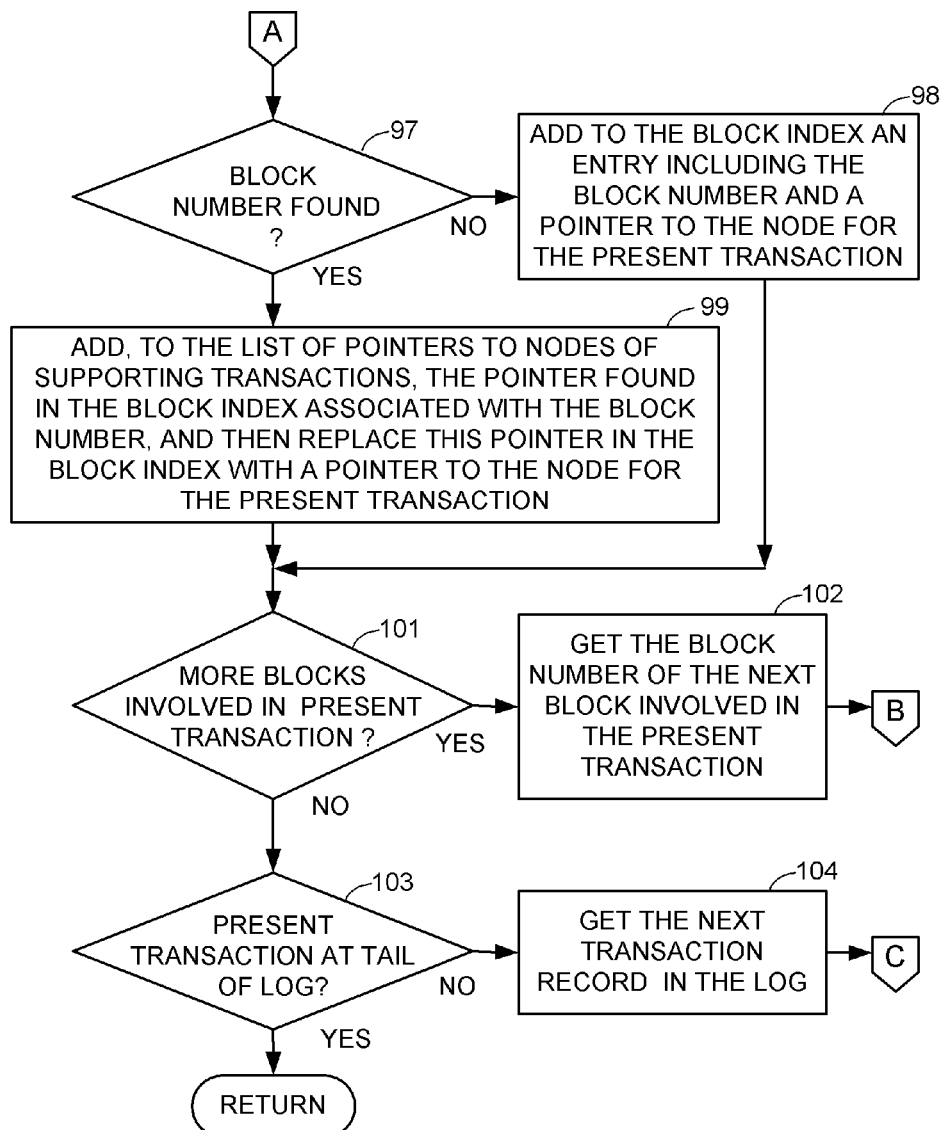

FIGS. 7 and 8 together show a subroutine for creating the dependency graph. In general, the not-yet-completed transactions and sub-transactions in the log are parsed so that each transaction is represented by a node in the graph, and edges in the graph represent dependencies upon earlier transactions. Parsing begins with the oldest not-yet-completed transaction in the log. When a unique block is encountered in a parsed transaction, an entry for the block is created in the block index, and this entry is set with a pointer to the node for the parsed transaction. If the block number already exists in the block index, then an edge is created pointing to the older transaction associated with this block number. In this way the dependency graph and the block index will be complete when the parsing is finished with the newest transaction in the log.

In a first step 91 in FIG. 7, a block index is allocated for the dependency graph. Next, in step 92, the transaction record of the first not-yet-completed transaction is accessed at the head of the log. Then, in step 93, a node for the present transaction is allocated, and this node is linked to the pointer to head (64 in FIG. 4) or to the previous node, and this node is initialized to contain the transaction record number, an initial state of "unrecovered," and an empty list of pointers to nodes of supporting transactions. For example, when the very first node is allocated, the pointer to tail (63 in FIG. 4) and the pointer to head (63 in FIG. 4) are each set to point to this first node. When a subsequent node is allocated, the pointer to tail (64 in FIG. 4) is accessed to find the previous node, and the pointer to the next node in this previous node is set to point to the subsequent node, and the pointer to tail is also set to point to this subsequent node.

In step 94, the transaction record is parsed to find one or more block numbers of blocks that are involved in the present transaction. In step 95, the block number of the first block involved in the transaction is obtained, and then in step 96 the block index is searched for this block number. Execution continues from step 96 to step 97 in FIG. 8.

In step 97 in FIG. 8, if the block number is not found in the block index, then execution branches from step 97 to step 98. In step 98, an entry including the block number and a pointer to the node for the present transaction is added to the block index.

In step 97 in FIG. 8, if the block number is found in the block index, then execution continues from step 97 to step 99. In step 99, the pointer to the node found in the block index associated with the block number, is added to the list (in the node of the present transaction) of pointers to nodes of supporting transactions, and then the pointer in the block index associated with the block number is replaced with a pointer to the node of the present transaction. After steps 98 or 99, execution continues to step 101.

In step 101, if more blocks are involved in the present transaction, then execution branches to step 102. In step 102, the block number of the next block involved in the present transaction is obtained, and execution loops back to step 96 in FIG. 8.

In step 101, if there are not any more blocks involved in the present transaction, then execution continues to step 103. In step 103, if the present transaction is at the tail of the log, then construction of the dependency graph is finished, and execution returns. Otherwise, execution branches from step 103 to step 104. In step 104, the next transaction record is obtained from the log, and execution loops back to step 93 in FIG. 7.

Figure 9:
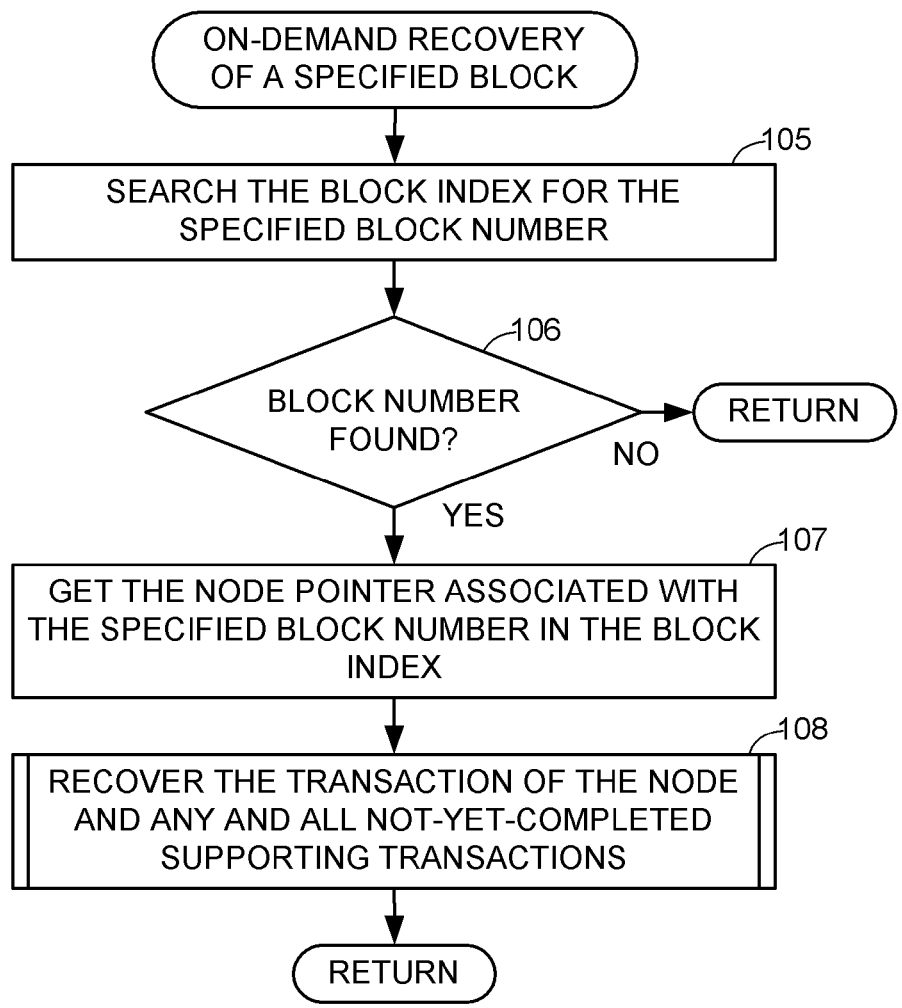
FIG. 9 is a flowchart of an on-demand recovery routine in the dataset manager in FIG. 1 for using the dependency graph to recover a specified block of storage in response to a client request for access to the specified block of storage.

FIG. 9 shows a subroutine for on-demand recovery of a specified block. In general, this subroutine checks whether or not the specified block is in the block index. If the specified block is in the block index, then a block recovery is needed before the block is accessed for a client or server application. The block recovery includes recovery of not only the transaction of the node associated with the specified block in the block index, but also recovery of any and all earlier not-yet-completed transactions that support the transaction of the node associated with the specified node. Also the recovery of each earlier not-yet-completed supporting transaction includes the recovery of any and all earlier not-yet-completed transactions that support the each earlier not-yet-completed supporting transaction. This may include earlier supporting transactions that do not access or modify the specified block, so that other blocks modified by the earlier supporting transactions are updated to be consistent with the recovery of the specified block. Any and all of these supporting not-yet-completed transactions are replayed, and this replay is done in time order from the earliest to latest when there are dependencies. This required time ordering of replay of the not-yet-completed dependent supporting transactions (and any and all of their dependent not-yet-completed supporting transactions) is done efficiently during a depth-first search of the graph by a recursive subroutine call.

For example, consider the case of the financial system in which the client desires to read the balance of the second account, which is stored in "BLOCK_Z". The on-demand recovery routine is called to recover the specified "BLOCK_Z". Suppose that the most recent not-yet completed transaction that involves "BLOCK_Z" is the transaction that includes the first sub-transaction "$ACCT1−$X→BLOCK_Y" and the second sub-transaction "$ACCT2+$X→BLOCK_Z". In this case the on-demand recovery of the specified block "BLOCK_Z" includes update of "BLOCK_Y" to be consistent with the recovered "BLOCK_Z" in accordance with this transaction. In other words, when the client is given the recovered "BLOCK_Z", the state of "BLOCK_Y" is also recovered to the state existing just after the transfer of "$X". Also, this recovery of "BLOCK_Y" will include the replay of any earlier not-yet-completed transactions that involve "BLOCK_Y". In general, when the dependency graph of FIG. 4 is constructed and used as shown in FIGS. 7 to 11, the dataset is always recovered to a state consistent with the not-yet-completed transactions, although this consistent recovery state might not be any state of the dataset that would have been reached absent the processor reboot and recovery. The consistent recovery state will not definitely reach a state that would have been reached absent the reboot and recovery until completion of the background recovery task.

In a first step 105 of FIG. 9, the block index is searched for the specified block number. In step 106, if the block number is not found in the block index, then execution returns. Otherwise, if the block number is found in the block index, then execution continues to step 107. In step 107, the node pointer associated with the specified block number is read from the block index. In step 108, a recursive subroutine (shown in FIG. 10) is called to recover the transaction of the pointed-to node and to recover any and all not-yet-completed supporting transactions. After step 108, execution returns.

In general, the depth-first search of the dependency graph is performed by calling a recursive subroutine that searches nodes of the dependency graph that are linked to a specified node by edges of the dependency graph that point from the specified node. The recursive subroutine does this search by calling itself for each of the nodes pointed to by edges that point from the specified node, and then replaying the not-yet-completed transaction corresponding to the specified node.

Figure 10:
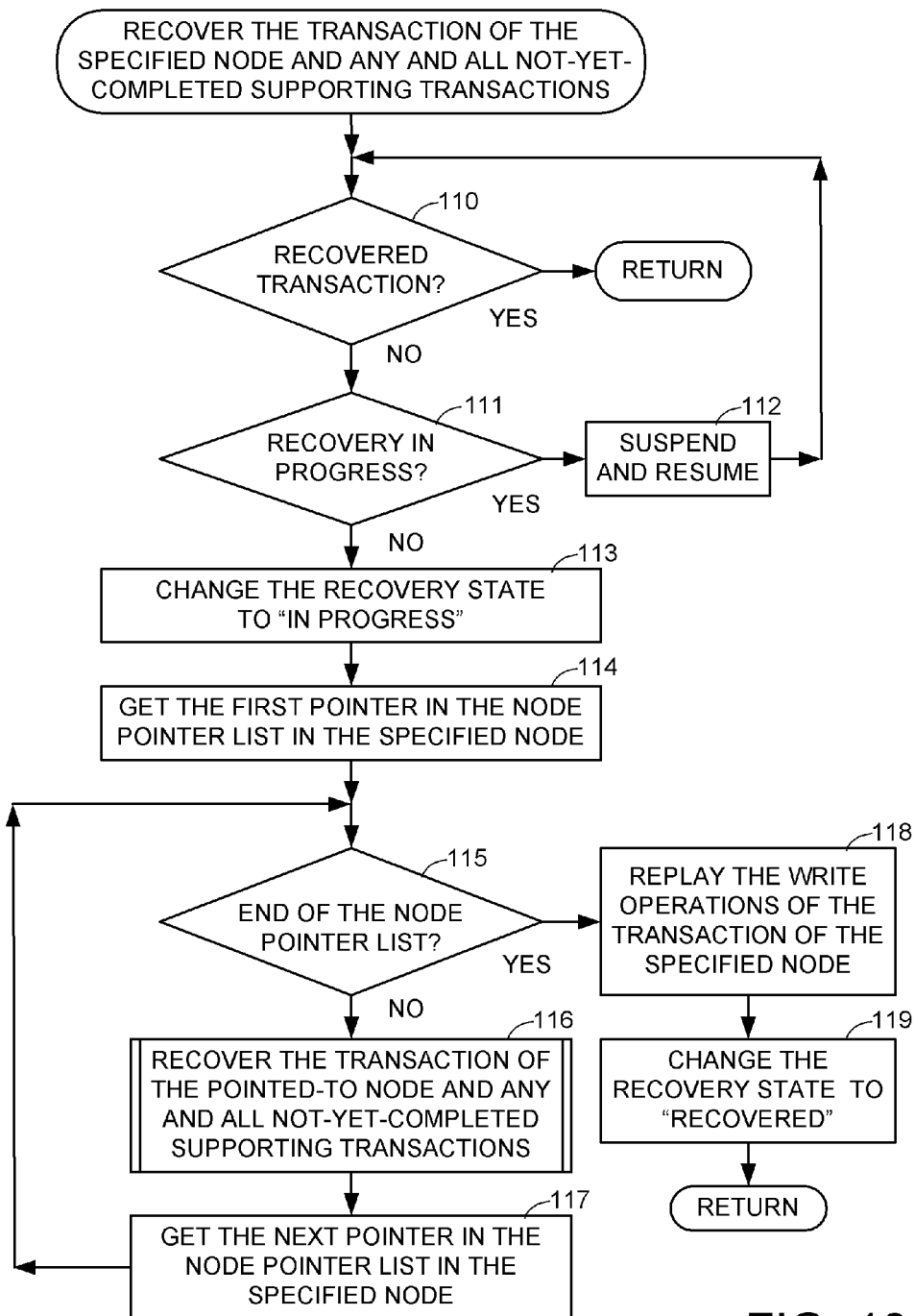
FIG. 10 is a flowchart of a recursive subroutine for recovering supporting transactions during a depth-first search of the dependency graph.

FIG. 10 shows the recursive subroutine (called in step 108 of FIG. 9) for recovering the transaction of a specified node and recovering any and all not-yet-completed supporting transactions. In a first step 110, if the specified node has a state of "recovered", then execution returns. Otherwise, execution continues to step 111. In step 111, if the specified node has a recovery state of "in progress," then execution continues to step 112 to suspend and resume execution, and then execution loops back to step 110. In this case, once the "in progress" recovery has been completed, execution will return from step 110.

In step 111, if recovery is not in progress for the node (so that the recovery state is "unrecovered"), then execution continues to step 113. In step 113, the recovery state is changed to "in progress". In step 114, the first pointer in the node pointer list to supporting nodes is obtained. Then in step 115, if the end of the node pointer list has not been reached, then execution continues to step 116. In step 116, the subroutine of FIG. 10 calls itself to recover the transaction of the pointed-to node and any and all not-yet-completed supporting transactions. Upon return from this recursive call, execution continues to step 117. In step 117, the next pointer is obtained from the list of supporting nodes. Execution loops back from step 117 to step 115.

In step 115, once the end of the node pointer list has been reached, execution branches from step 115 to step 118. In step 118, the write operations of the transaction of the specified node are replayed. Then in step 119, the recovery state of the specified node is changed to "recovered," and execution returns.

Figure 11:
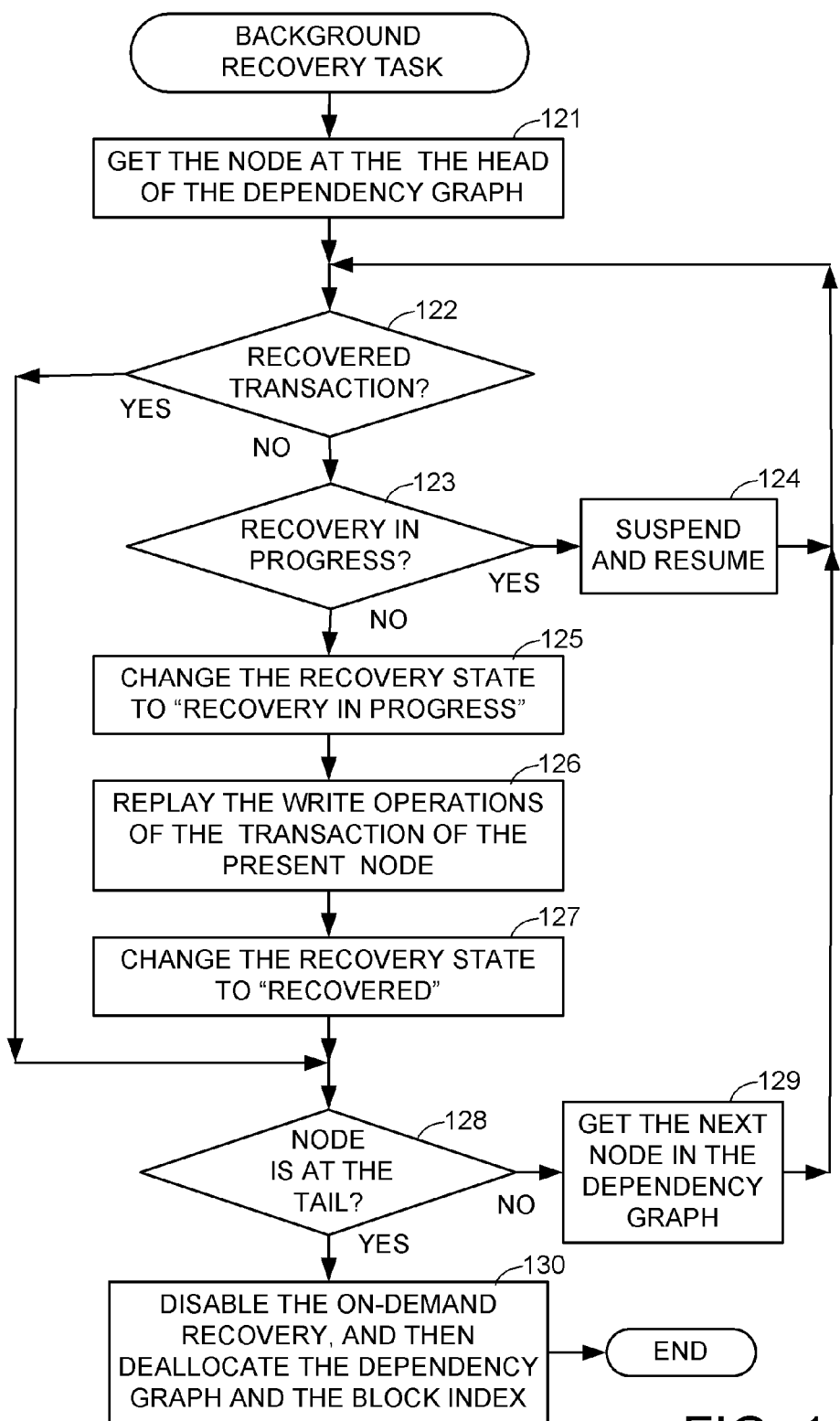
FIG. 11 is a flowchart of a background task for replay of not-yet-completed transactions in the transaction log.

FIG. 11 shows the background recovery task. In a first step 121, the node at the head of the dependency graph is accessed. Then, in step 122, if the recovery state of this present node is "recovered", then execution branches to step 128. Otherwise, if the recovery state is not "recovered, then execution continues to step 123. In step 123, if the recovery state of the node is "in progress," then execution branches to step 124 to suspend and resume the background recovery task. Execution loops back to step 122 until the recovery state changes to "recovered," and execution branches from step 122 to step 128.

In step 123, if the recovery state is not "in progress," then the recovery state is "unrecovered" and execution continues to step 125. In step 125, the recovery state of the present node is changed to "in progress." Then, in step 126, the transaction of the present node is recovered by replay of the write operations of the transaction. Then, in step 127, the recovery state of the present node is changed to "recovered". Execution continues from step 127 to step 128.

In step 128, if the present node is not at the tail of the dependency graph, then the next node in the dependency graph is accessed in the time order sequence. This next node is pointed to by the "pointer to next node" (83 in FIG. 6) in the present node. Execution loops from step 129 back to step 122, so that this "next node" becomes the present node for the next iteration through the loop of steps 122 to 129.

In step 128, once the present node is the node at the tail of the dependency graph, execution continues to step 130. In step 130, the on-demand recovery routine is disabled, and then, after any concurrent on-demand recovery operations have finished, the random access memory of the dependency graph and the block index is deallocated. After step 130, the background recovery task is terminated.

3. Multi-Threaded In-Memory Processing of the Transaction Log

It is desired to further reduce the time for on-demand recovery of a specified block, and the time for completing the background recovery, by use of multi-thread programming. It is also desired to do this in a way that integrates the on-demand recovery and the background recovery with the block index, writeback queue, and multi-threaded writeback programming associated with a conventional dataset cache of a server.

As introduced above, sub-transactions in the form of writing a specified constant update to a specified data block have the advantage that they are idempotent, meaning that they can be repeated any number of times without changing their result. Two transactions comprised of only such sub-transactions have the additional advantage that dependencies will arise between the two transactions only if the two transactions update the same data block. Therefore all the dependencies between the transactions can be eliminated by replay of the sub-transactions upon the shared blocks in the order in which the sub-transactions appear in the transaction log. Further, if a client desires concurrent access to a specified data block of the dataset during replay of the transaction log, the client may be granted the concurrent access as soon as all the sub-transactions upon specified data block have been replayed. Once all of the sub-transactions of the specified data block have been replayed, all of the dependencies have been eliminated between the not-yet-completed transactions and the client access to the specified data block. Any other sub-transactions of these partially-replayed transactions are replayed later to recover the entire dataset. For efficient replay of the remaining sub-transactions, a record is kept of the particular blocks that have been recovered.

Transactions comprising sub-transactions in the form of writing a specified constant update to a specified block also have the advantage of supporting multi-threaded log replay with log space recovery during the replay process. For each data block modified by at least one sub-transaction of the not-yet-completed transactions in the log, a block replay list is compiled of all of the sub-transactions that modify the data block. (For the sake of brevity, the not-yet-completed transactions in the transaction log will also be referred to simply as the "active" transactions.) The block replay lists are compiled during parsing of the transaction log. When the parsing of the transaction log first encounters a particular data block of a sub-transaction, a block replay list for the block is created and inserted on the tail of a first-in first-out (FIFO) queue.

For example, during log replay, the queue is serviced by multiple replay threads. The list at the head of the queue is serviced by the next idle replay thread. In this fashion, priority is given to replay of sub-transactions that appear in the oldest active transaction, so that log storage space for the oldest active transaction is reclaimed once all of the sub-transactions have been replayed for the oldest active transaction. The process of reclaiming log storage space is facilitated by setting a "log hold" for each sub-transaction of each active transaction. Upon receipt of an acknowledgement from storage that a recovered data block has been written to storage, the "log hold" is released for each sub-transaction having modified the data block. Therefore, the log storage space for the oldest active transaction in the log is reclaimed by advancing the log head pointer to the next oldest active transaction once all of the "log holds" have been released for the sub-transactions in the oldest active transaction. For example, the "log holds" for a data block are released during a final scan of the replay list for the data block, and then the replay list is deallocated. In a similar fashion, the log space is reclaimed during a scan of the transaction log, in which progression of this scan is held up by the "log holds".

The queue can also be used at the writeback queue for the dataset cache. In this case, when a client writes to a recovered data block concurrent with the log replay, another entry for the data block is inserted on the tail of the FIFO queue. Writeback threads service the queue. For example, the cache state of a block is augmented by additional replay and recovery states, and the writeback thread coding is modified to be aware of the additional replay and recovery states, and to perform the releasing of the log holds during a final scan of the replay list for a replayed data block upon acknowledgement of writeback of the replayed data block to storage.

Figure 12:
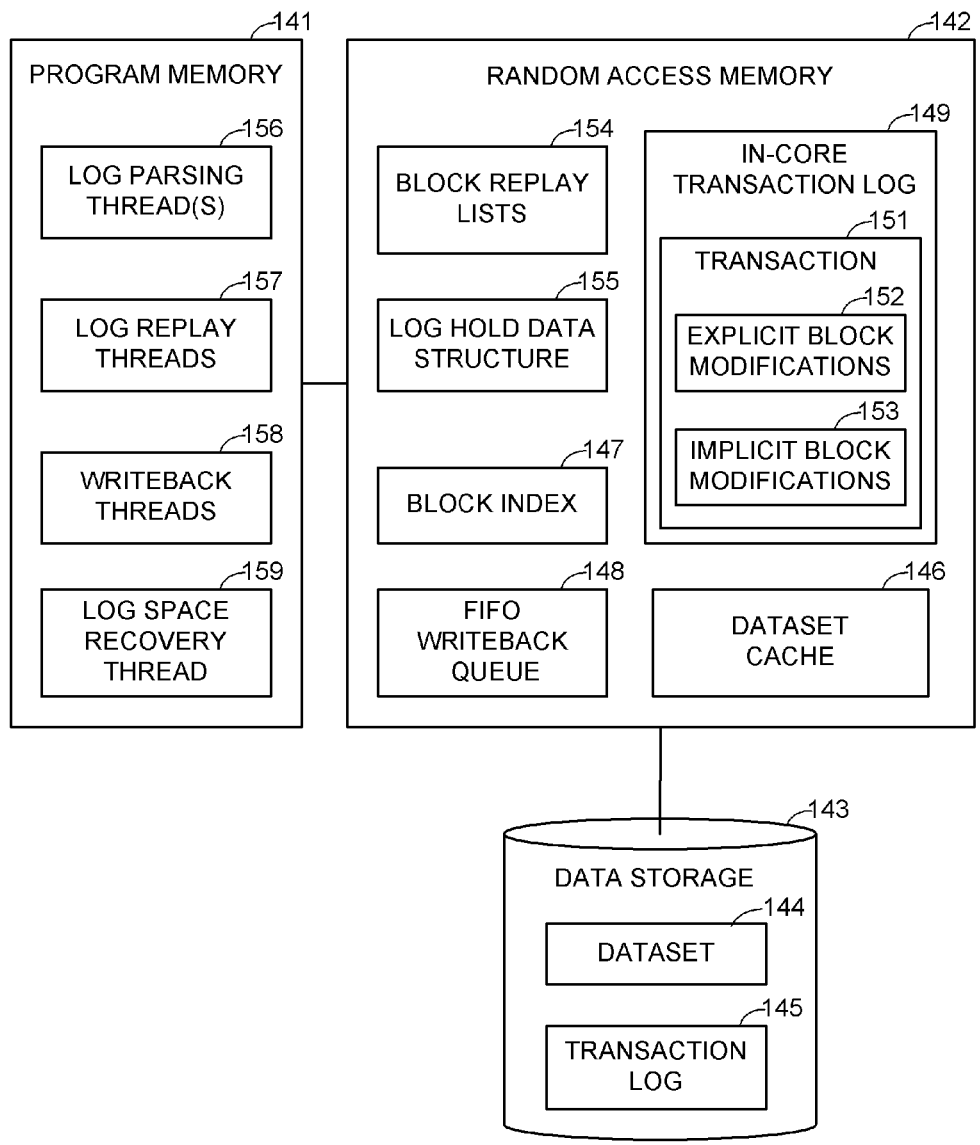
FIG. 12 is a block diagram of programs and data structures in a multi-threaded embodiment of a server computer providing clients with concurrent access to data during replay of a transaction log.

FIG. 12, for example, shows program memory 141, random access memory 142, and data storage 143 for a server similar to the server of FIG. 1. The data storage 143 stores a dataset 144 and a transaction log 145. The random access memory 142 includes a dataset cache 146 and an in-core transaction log 149.

Each transaction 151 in the in-core transaction log 149 includes explicit block modifications that explicitly appear in the transaction log 145 in the data storage 143, and may also include implicit block modifications 153 that are inserted in the in-core transaction log 149 when the in-core transaction log 149 is produced by parsing the transaction log 145 from the data storage 143. For example, in a file server, a transaction for allocating a data block to a file may include an explicit sub-transaction of updating a metadata block of a "free block" map in order to indicate that the allocated data block is no longer free. The parsing may produce a record in the in-core transaction log for an implicit sub-transaction that modifies another metadata block (called a block metadata block, or BMD) in order to identify the file to which the particular data block is allocated. The production of records 153 in the in-core transaction log 149 for sub-transactions that are implicit in the on-disk transaction log 145 is a way of keeping the on-disk transaction log 145 for a complex file system compact and compliant with a standard file system.

The random access memory 142 also includes a block index 147 for the dataset cache 146, a writeback FIFO queue 148, block replay lists 154, and a log hold data structure 155. (Alternatively, as further described below with reference to FIG. 18, the log hold data structure 155 can be integrated into the in-core transaction log 149.) The program memory 141 includes one or more log parsing threads 156, multiple log replay threads 157, multiple writeback threads 158, and a log space recovery thread 159.

Figure 13:
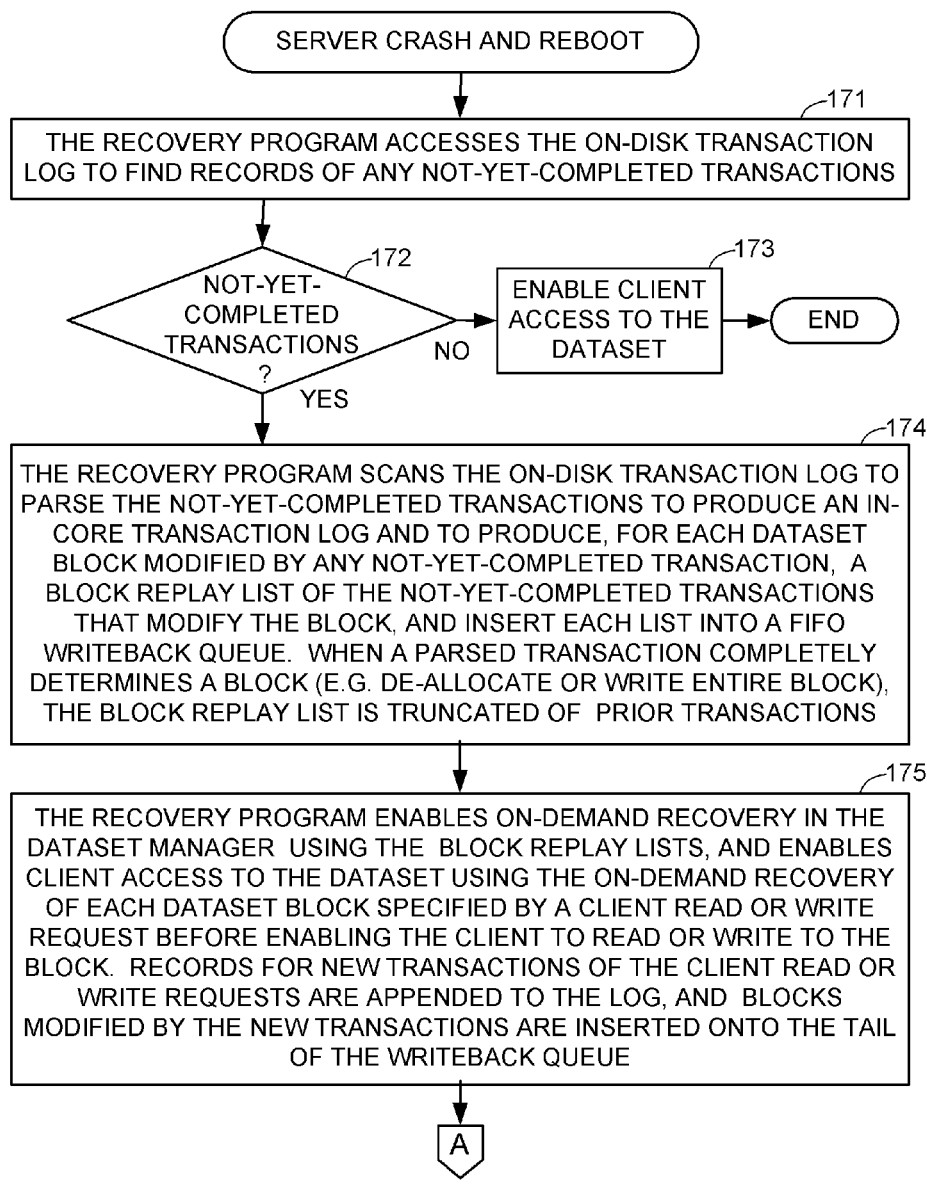
FIGS. 13 and 14 together comprise a flowchart of a recovery program for the embodiment of FIG. 12.
Figure 14:
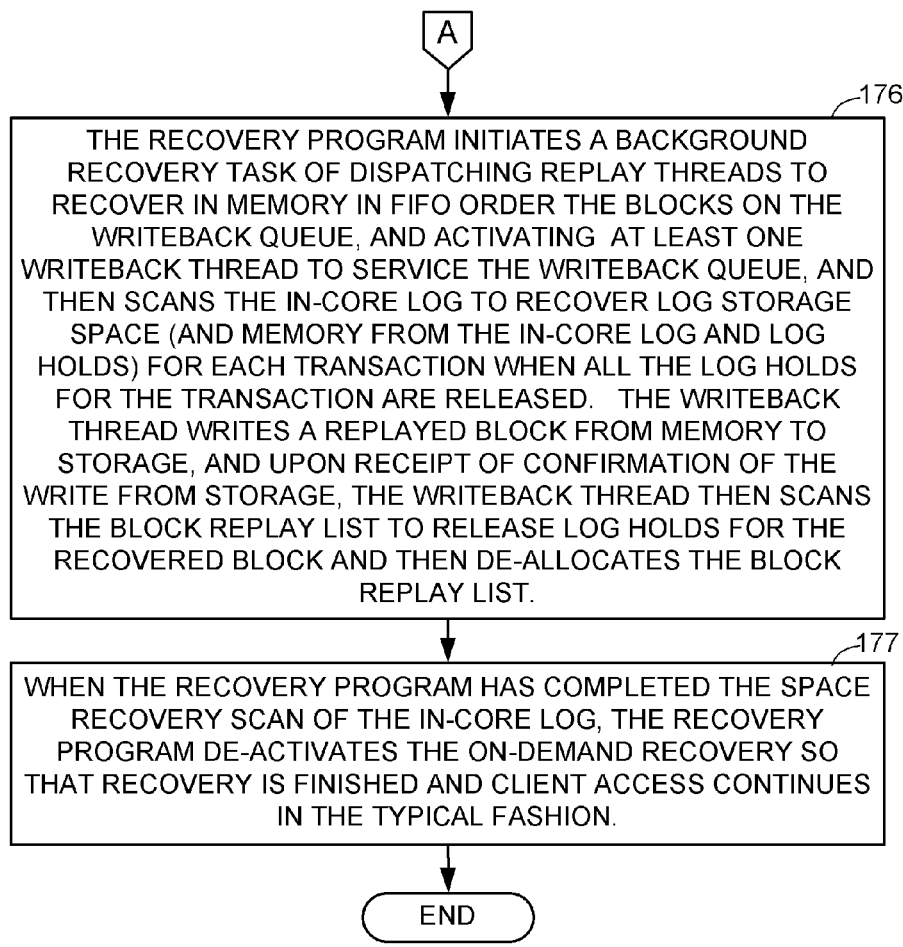

FIGS. 13 and 14 show a recovery program that includes the log recovery thread and a single log parsing thread. (The alternative of using more than one log parsing thread is described below with reference to FIGS. 22 and 23.) The recovery program is invoked upon reboot of the server.

In a first step 171 of FIG. 13, the recovery program accesses the on-disk transaction log to find records of any not-yet-completed transactions. In step 172, if not-yet-completed transactions are not found in the on-disk transaction log, then execution branches to step 173 to enable client access to the dataset, and then the recovery program is finished. Clients may then access the dataset in a conventional fashion.

In step 172, if not-yet-completed transactions are found in the on-disk transaction log, the execution continues to step 174. In step 174, the recovery program scans the on-disk transaction log to produce an in-core transaction log of the not-yet-completed transactions, and to create, for each data block modified by any not-yet-completed transaction, a block replay list of the not-yet-completed transactions that modify the block. Each block replay list is inserted into the FIFO writeback queue. Moreover, when a parsed transaction completely determines a data block, the block replay list for this data block is truncated of prior transactions.

For example, a transaction that de-allocates a data block completely determines the data block by clearing the content of the data block. A transaction that performs a complete write to the data block also completely determines the data block. In either case, any prior transactions upon the data block have no effect upon the outcome of the transaction that completely determines the data block.

When there is a single log parsing thread, the transaction log could be scanned either from the oldest active transaction (the head of the log) or from the youngest active transaction (the tail of the log). For the case of scanning from the oldest active transaction to the youngest active transaction, the block replay list is truncated by unlinking the prior list entry or the string of prior list entries and putting the list entry or string of prior list entries on a queue of list entries to be returned to free memory. For example, servicing of this queue of list entries to be returned to free memory is deferred until the transaction log has been parsed and client access to the dataset has been enabled. Servicing of this queue includes releasing log holds for the entries as the entries are returned to free memory, in an implementation that has previously set a log hold for the sub-transaction of each entry. For the case of scanning from the youngest active transaction to the oldest active transaction, the block replay list is truncated by marking the block replay list so that the block replay list accepts no additional (older) entries (and so that a log hold is not set for any older sub-transaction upon the data block that has been completely determined).

In step 175, after the recovery program has scanned the on-disk transaction log to produce the block replay lists, the recovery program enables on-demand recovery in the dataset manager using the block replay lists, and then enables client access to the dataset using the on-demand recovery. For example, the dataset is a volume of storage or a file system built on such a volume, the on-demand recovery is enabled by setting an attribute of the volume or file system to indicate that recovery of the volume or the file system is "in progress," and client access to the dataset is enabled by mounting the volume. Thereafter, in response to a client read or write request to access a specified data block, an on-demand recovery routine is invoked to recover the specified data block before execution of a conventional dataset manager routine for reading from or writing to the specified data block. Records for new transactions of client write requests are appended to the on-disk transaction log, and data blocks modified by the new transactions are inserted onto the tail of the FIFO writeback queue. Execution continues from step 175 to step 176 in FIG. 14.

In step 176 of FIG. 14, the recovery program initiates a background recovery task of dispatching log replay threads to recover in memory the data blocks on the FIFO writeback queue, giving priority to replaying the block replay lists at or near the head of the FIFO writeback queue, and also activating at least one writeback thread to service the FIFO writeback queue. Then the recovery program scans the in-core transaction log to recover log storage space (and memory of the in-core transaction log and log holds) for each transaction when all of the log holds for the transaction are released. The writeback thread writes a replayed data block from memory to the storage, and upon receipt of confirmation of the write from the data storage, the writeback thread then scans the block replay list of this recovered data block to release the log holds for this recovered block. Finally, in step 177, when the recovery program has completed the space recovery scan of the in-core log, the recovery program de-activates the on-demand recovery so that the recovery of the dataset is finished, and client access to the dataset continues in the conventional fashion.

Figure 15:
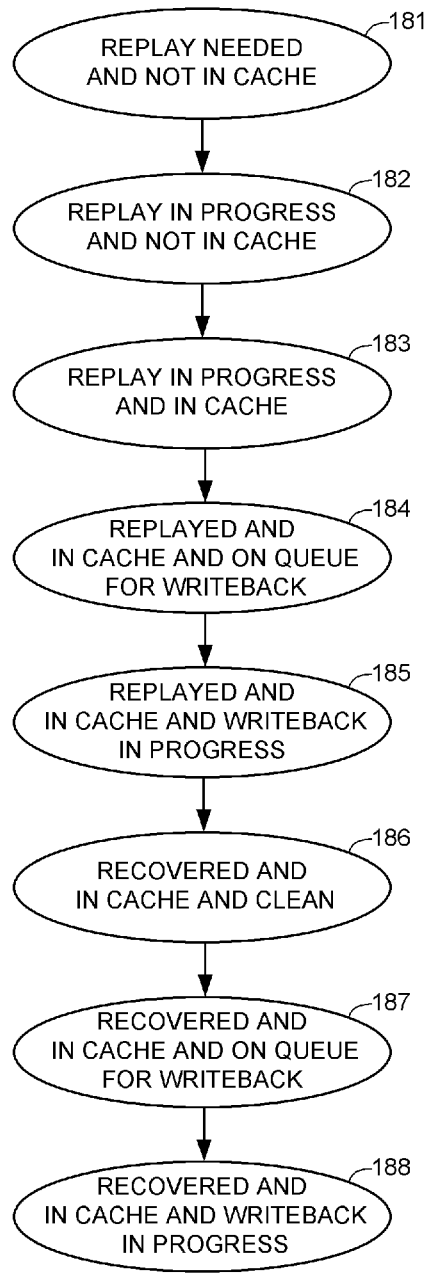
FIG. 15 is a state diagram for a file system block in the embodiment of FIG. 12.

FIG. 15 shows a sequence of states for a data block in the embodiment of FIG. 12, beginning with an initial state 181 of "replay needed and not in cache" for each data block modified by any active transaction in the transaction log after a server crash and reboot. The state 181 results from a log parsing thread (156 in FIG. 12) of the recovery program (step 174 in FIG. 13) parsing the on-disk transaction log (145 in FIG. 12) to produce the in-core transaction log (149 in FIG. 12) and the block replay lists (154 in FIG. 5). In particular, the initial state 181 is created (and set in the block index 147 of FIG. 12) when the parsing thread creates the replay list for the thread and inserts the replay list on the tail of the FIFO writeback queue.

The state of the data block progresses from the initial state 181 to a "replay in progress and not in cache" state 182 when a replay thread gains exclusive access to the block replay list of the data block. Then the state of the data block progresses to a "replay in progress and in cache" state 183 when this replay thread has fetched the data block from storage and has loaded the data block into the dataset cache (146 in FIG. 12). Once the replay thread has completed replay of the sub-transactions on the replay list upon the data block in the dataset cache, the replay thread changes the state of the data block to a "replayed and in cache and on queue for writeback" state 184.

After one of the writeback threads (158 in FIG. 12) services the FIFO writeback queue and finds that it is servicing a queue entry including the data block, this writeback thread changes the state of the data block to a "replayed and in cache and writeback in progress" state 185. Once the writeback thread writes the data block to data storage and receives confirmation of the write from the data storage, and the writeback thread does a final scan of the block replay list to release the log holds corresponding to the sub-transactions on the block replay list, the writeback thread changes the state of the data block to "recovered and in cache and clean" 186.

When the recovered data block in the dataset cache is written to in response to a client request, the dataset manager (42 in FIG. 1) puts the data block on the FIFO writeback queue and changes the state of the data block to "recovered and in cache and on queue for writeback" 187. When a writeback thread picks up this queue entry for writeback to storage, the writeback thread changes the state of the data block to "recovered and in cache and writeback in progress" 188. When this writeback thread writes the data block to the data storage and receives confirmation of the write from the data storage, the writeback thread changes the state of the data block back to the state of "recovered and in cache and clean" 186.

Figure 16:
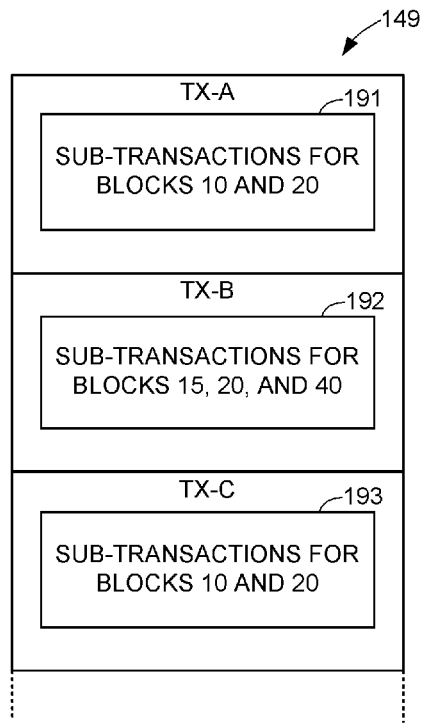
FIG. 16 is an example of an in-core transaction log introduced in FIG. 12.

FIG. 16 shows an example of the in-core transaction log 149 introduced in FIG. 12. As further shown in FIG. 16, a first transaction TX-A includes sub-transactions 191 for blocks having file system block numbers 10 and 20, a second transaction TX-B includes sub-transactions 192 for blocks having file system block numbers 15, 20, and 40, and a third transaction TX-C includes sub-transactions 193 for blocks having file system block numbers 10 and 20.

Figure 17:
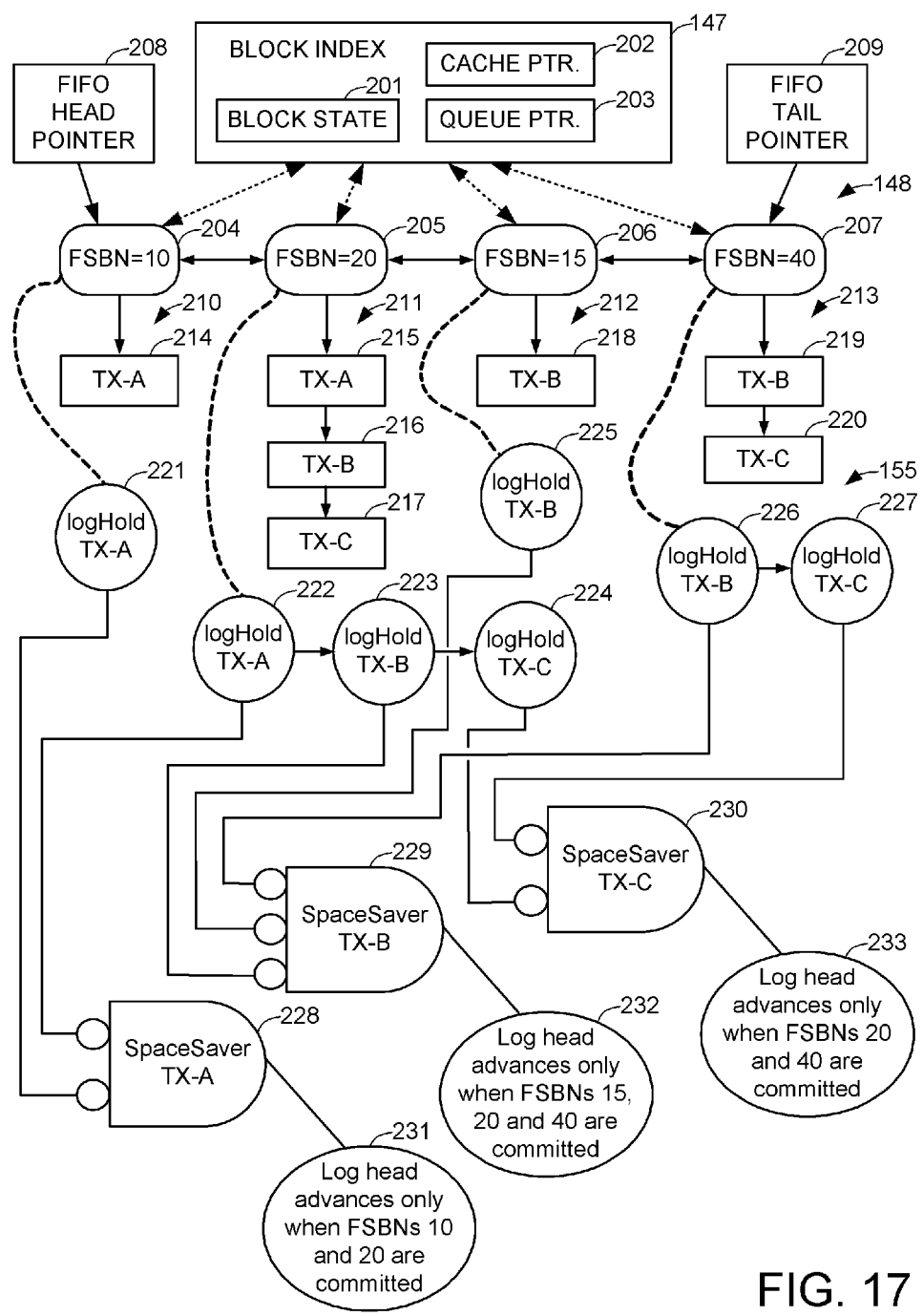
FIG. 17 is a schematic diagram of data structures produced in the embodiment of FIG. 12 during replay of the transaction log of FIG. 16.

FIG. 17 shows a specific example of data structures produced in the embodiment of FIG. 12 from the transaction log of FIG. 16. The block index 147 includes the block state 201 for each block on the FIFO writeback queue 148 or in the dataset cache (146 in FIG. 12), and a queue pointer 203 for each block on the FIFO writeback queue 148, and a cache pointer 202 for each block in the dataset cache. The FIFO writeback queue 146 includes entries 204, 205, 206, 207 for blocks having file system block numbers (FSBNs) equal to 10, 20, 15, and 40, respectively. The FIFO writeback queue 148 also includes a pointer 208 to the entry at the head of the queue, and a pointer 209 to the entry at the tail of the queue.

In FIG. 17, parsing of the first three transactions TX-A, TX-B, and TX-C in the transaction log (149 in FIG. 16) has produced a respective replay list 210, 211, 212, 213 for each of the data blocks having FSBN=10, FSBN=20, FSBN=15, and FSBN=40. The replay list 210 for FSBN=10 has one entry 214 for a sub-transaction in TX-A. The replay list 211 for FSBN=20 has three entries 215, 216, 217 for sub-transactions in transactions TX-A, TX-B, and TX-C, respectively. The replay list 212 for FSBN=15 has one entry 218 for a sub-transaction in TX-B. The replay list 213 for FSBN=40 has two entries 219 and 220 for sub-transactions in TX-B and TX-C, respectively.

In FIG. 17, each entry of each replay list has a corresponding log hold. Thus, log holds 221, 222, 223, 224, 225, 226, and 227 correspond to replay list entries 214, 215, 216, 217, 218, 219, and 220, respectively. For example, each log hold is a bit that is set when the corresponding sub-transaction is put into the in-core transaction log when the in-core transaction log is produced, and the log hold cleared after the corresponding sub-transaction has been committed upon receipt of confirmation that the corresponding replayed data block has been written to storage.

In FIG. 17, a respective "SpaceSaver" logic function 228, 229, 230 for each transaction TX-A, TX-B, TX-C is enabled upon release of all of the log holds for the transaction. Thus, each "SpaceSaver" logic function 228, 229, 230 is represented by the logic symbol for a "NAND" gate. Therefore the log space recovery thread (159 in FIG. 12, step 176 in FIG. 13) recovers the log space of TX-A in the operation 231 by advancing the log head past TX-A only when FSBNs 10 and 20 are committed, and recovers the log space of TX-B in operation 232 by advancing the log head past TX-B only when FSBNs 15, 20, and 40 are committed, and recovers the log space of TX-C in operation 233 by advancing the log head past TX-C only when FSBNs 20 and 40 are committed.

Figure 18:
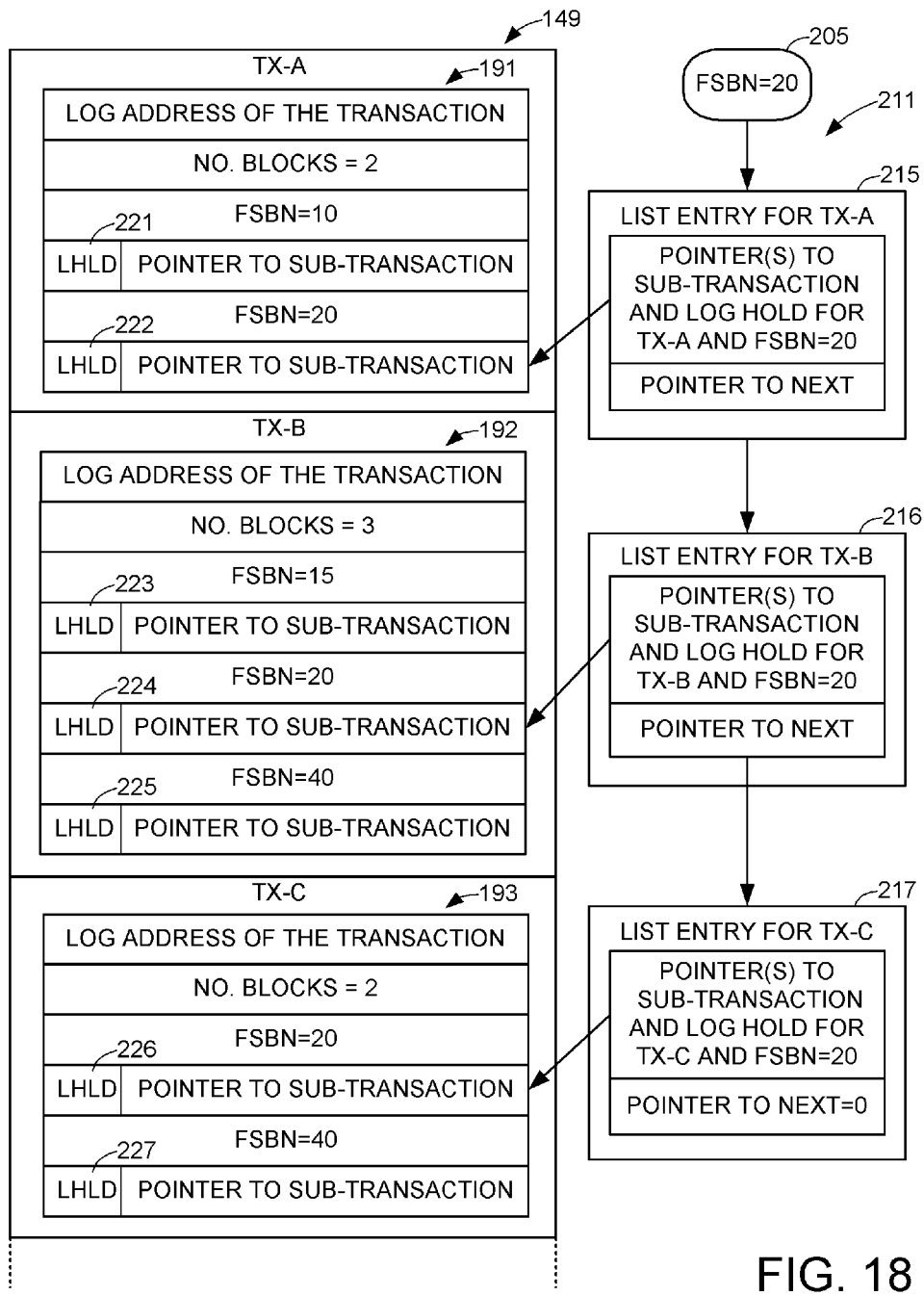
FIG. 18 is a specific example of the transaction log of FIG. 16 and a list of sub-transactions for recovery of a particular dataset block.

FIG. 18 shows a more specific example of the in-core transaction log 149 and the block replay list 211 of sub-transactions for recovery of FSBN=20. In the in-core transaction log, each log hold 221, 222, 223, 334, 225, 226, 227 is the most significant bit (labeled "LHLD") in a field for a pointer to the respective sub-transaction.

For each transaction TX-A, TX-B, and TX-C, the in-core transaction log includes the log address of the transaction in the on-disk transaction log, the number of data blocks modified by the transaction, the FSBN for each of these data blocks modified by the transaction, and a pointer field for a "log hold" bit and a pointer to the sub-transaction that modifies the data block. For example, each sub-transaction specifies a partial or full write operation upon the data block.

The organization of the in-core transaction log 149 facilitates scanning by the log space recovery thread (159 in FIG. 12) to read the log holds and hold up the log space recovery scan until the log holds are released. In short, if the space recovery scan finds that a log hold is not released, the scan is suspended for a predetermined amount of time, and then the scan is continued by again checking whether this log hold is released. Once the space recovery scan progresses to the next transaction, the head of the on-disk transaction log is advanced to the log address of this next transaction in the on-disk transaction log.

Each entry of the block replay list 211 includes a pointer to the corresponding sub-transaction pointer field in the in-core transaction log 149, and a pointer to a next entry in the replay list (or a null pointer value indicating the end of the list). Therefore, each entry of the replay list facilitates addressing of the in-core transaction log to execute the corresponding sub-transactions when a replay thread first scans the block replay list, and also facilitates addressing of the in-core transaction log to release the corresponding log holds when a writeback thread performs a second and final scan of the block replay list after the block has been committed to the dataset in the data storage.

Figure 19:
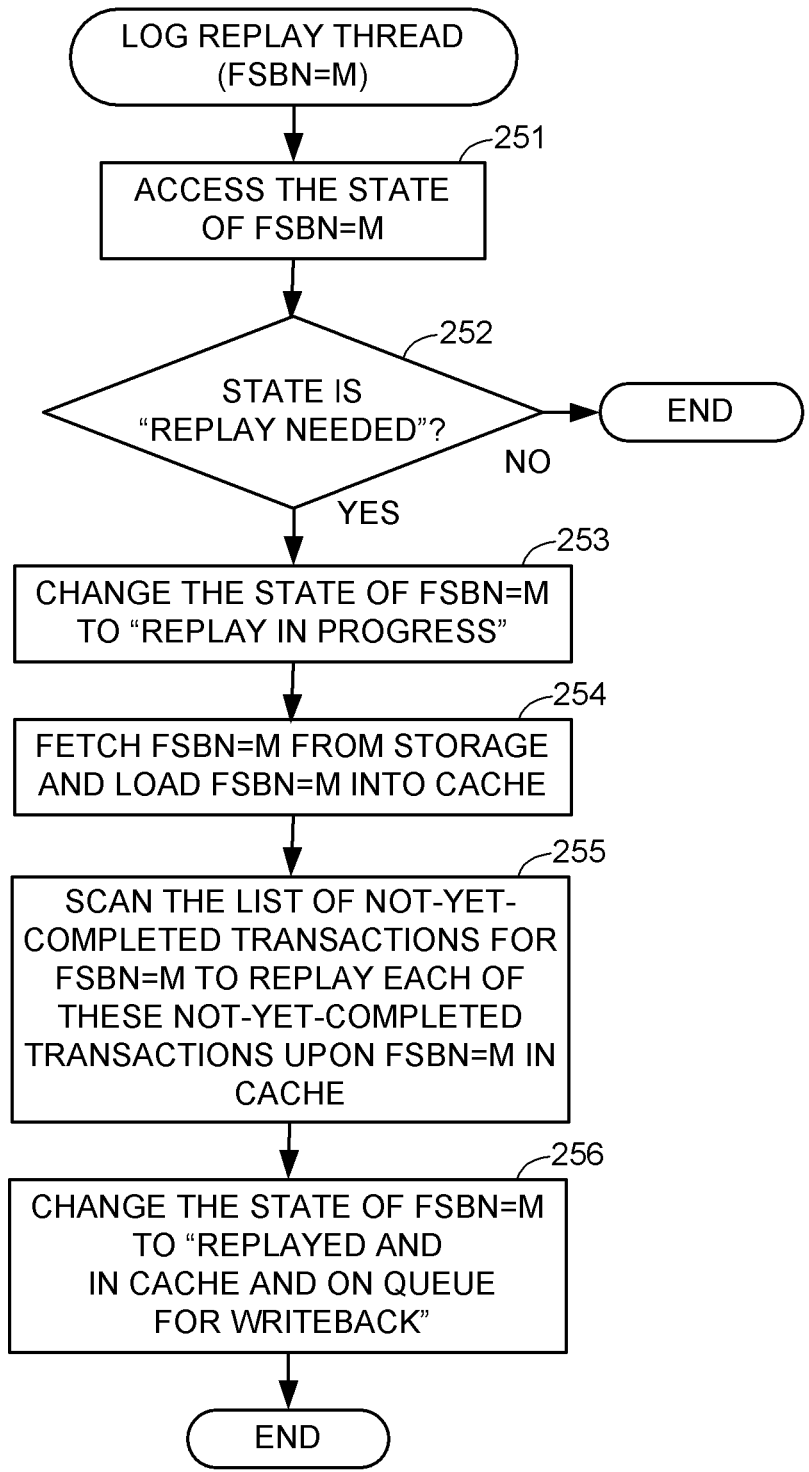
FIG. 19 is a flowchart of a log replay thread in the embodiment of FIG. 12.

FIG. 19 shows a log replay thread assigned to replay the block replay list of a specified data block, which will be referred to as FSBN=M. In a first step 251, the state of FSBN=M (201 in FIG. 17) is accessed in the block index (147 in FIG. 17). Next, in step 252, if the state is not "replay needed," then execution of the thread is finished. Otherwise, execution continues to step 253. In step 253, the state of FSBN=M is changed to "replay in progress." Then in step 254, FSBN=M is fetched from the dataset in storage and loaded into the dataset cache. In step 255, the log replay thread scans the block replay list of not-yet-completed transactions for FSBN=M to replay each of these not-yet-completed transactions upon FSBN=M in the dataset cache. For example, this is done by executing, for each entry of the block replay list, a respective sub-transaction specified by a pointer in the entry. Finally, in step 256, the replay thread changes the state of FSBN=M to "replayed and in cache and on queue for writeback."

Figure 20:
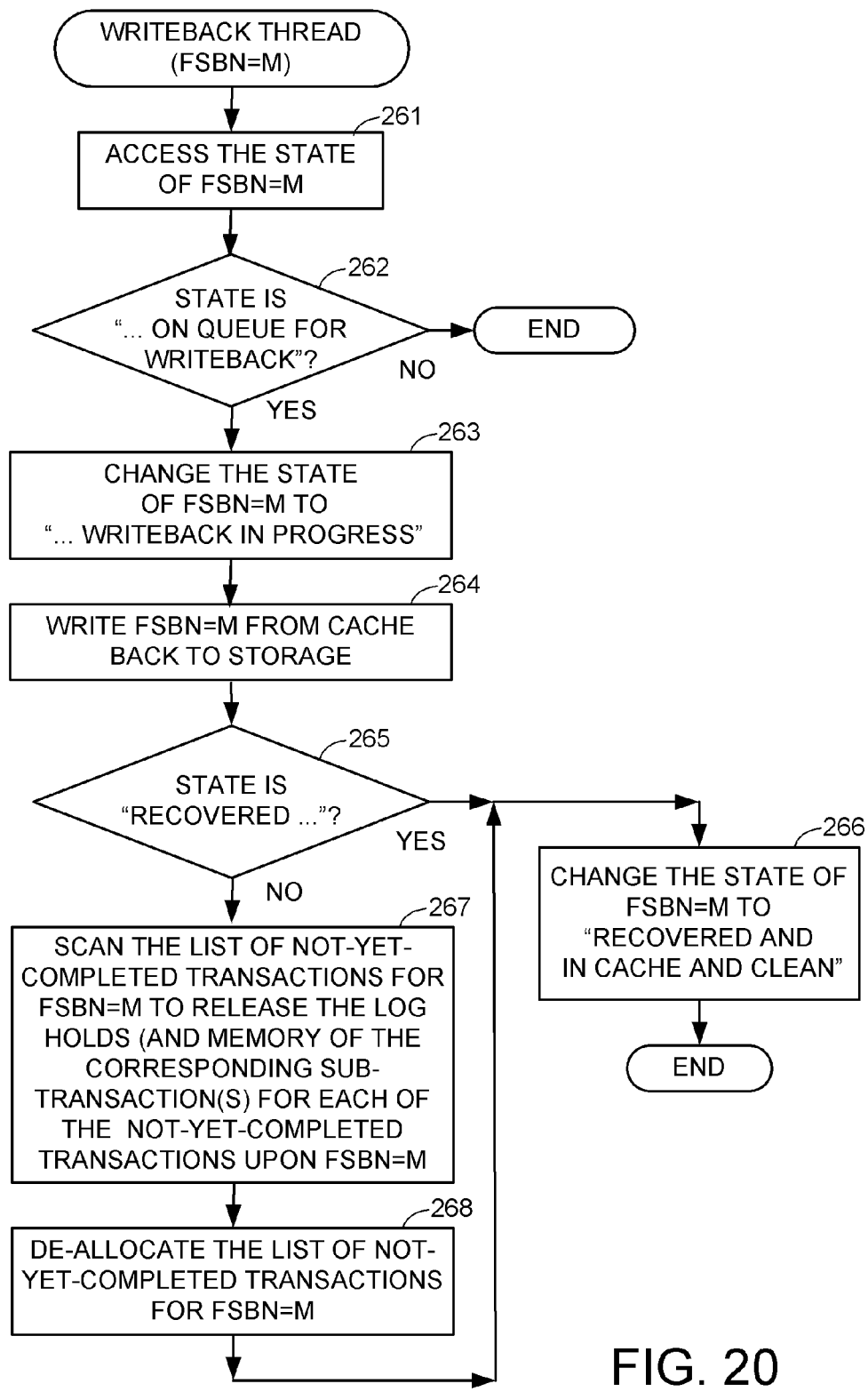
FIG. 20 is a flowchart of a writeback thread in the embodiment of FIG. 12.

FIG. 20 shows a writeback thread assigned to writeback the FSBN=M. In a first step 261, the writeback thread access the state of FSBN=M. In step 262, if the state is not " . . . on queue for writeback", then execution of the thread is finished. Otherwise, execution continues to step 263. In step 263, the state of FSBN=M is changed to " . . . writeback in progress", and the "replayed" or "recovered" part of the state is not changed. In step 264, the writeback thread writes FSBN=M from cache back to the data storage. In step 265, if the state is "recovered . . . ", then execution branches to step 266 to change the date of FSBN=M to "recovered and in cache and clean", and then execution of the writeback thread is finished.

In step 265, if the state is not "recovered . . . ", then execution continues to step 267. In step 267, the block replay list for FSBN=M is scanned to release the log holds (and to release the memory of the corresponding sub-transactions) for each of the not-yet-completed transactions upon FSBN=M. Then, in step 268, the replay list for FSBN=M is deallocated. Execution continues to step 266, to change the state of FSBN to "recovered and in cache and clean", and then execution of the writeback thread is finished.

Figure 21:
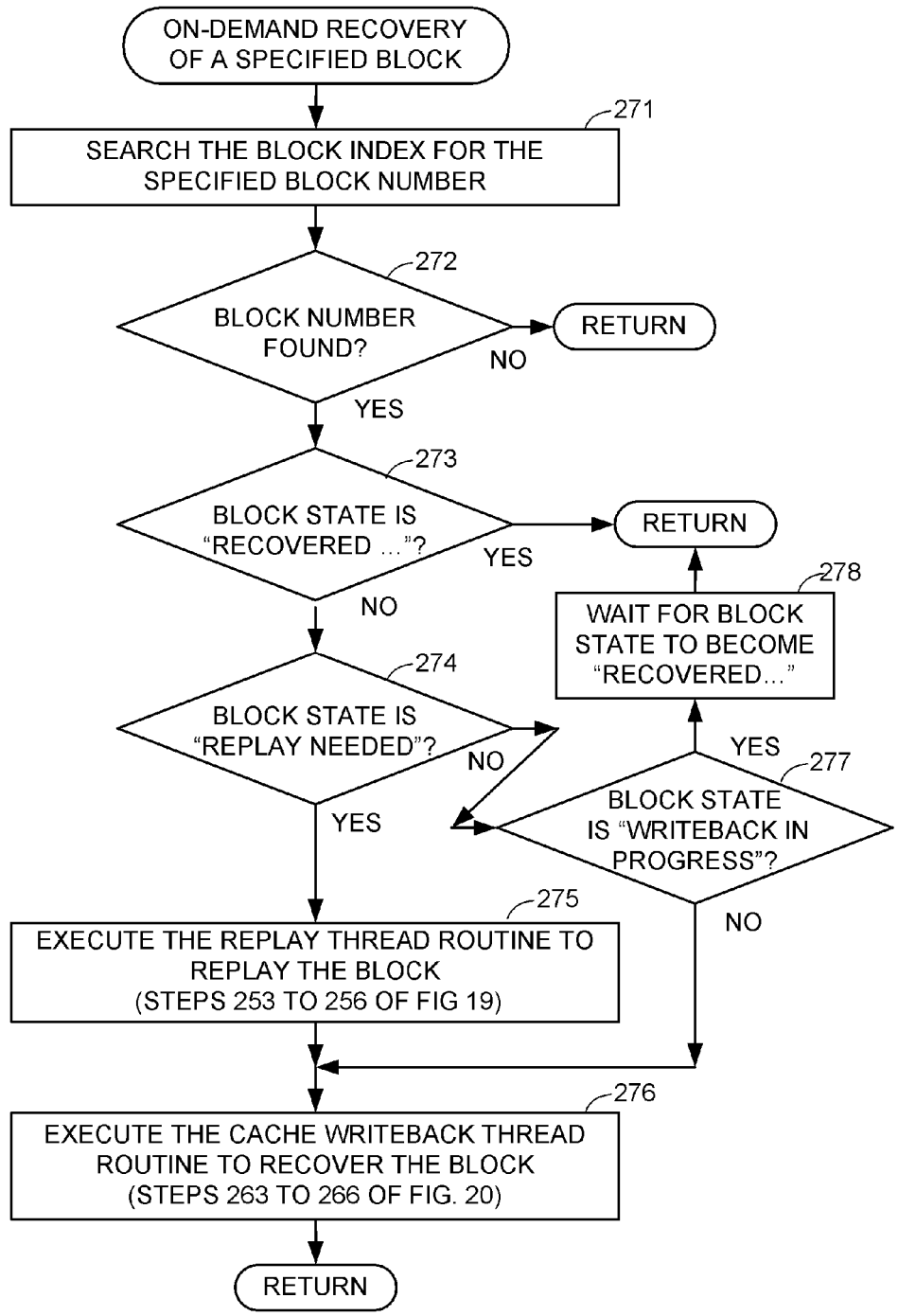
FIG. 21 is a flowchart of an on-demand recovery routine for the embodiment of FIG. 12.

FIG. 21 shows an on-demand recovery routine for recovery of a specified block for the multi-threaded embodiment of FIG. 12. In a first step 271 in FIG. 21, the block index is searched for the specified block number. In step 272, if the block number is not found in the block index, then the on-demand recovery is finished, so execution returns. Otherwise, execution continues to step 273. In step 273, if the block state of the specified block is "recovered...", then the on-demand recovery is finished, so execution returns. Otherwise, execution continues to step 274.

In step 274, if the block state of the specified block is "replay needed", then execution continues to step 275 to execute the replay thread routine to replay the block (steps 253 to 256 of FIG. 19). Execution continues from step 275 to step 276. In step 276, the cache write writeback thread routine (steps 263 to 266 of FIG. 20) is executed to recover the block, and then execution returns.

In step 274, if the state of the specified block is not "replay needed", then execution branches to step 277. In step 277, if the state of the specified block is not "writeback in progress", then the state of the specified block must be "replayed and in cache and on queue for writeback" so execution continues to step 276 to execute the cache writeback thread routine to writeback the replayed block. Otherwise, if the state of the specified block is "writeback in progress', then execution branches from step 277 to step 278. In step 278, the on-demand recovery routine waits for the state of the specified block to become "recovered...", and then execution returns.

Figure 22:
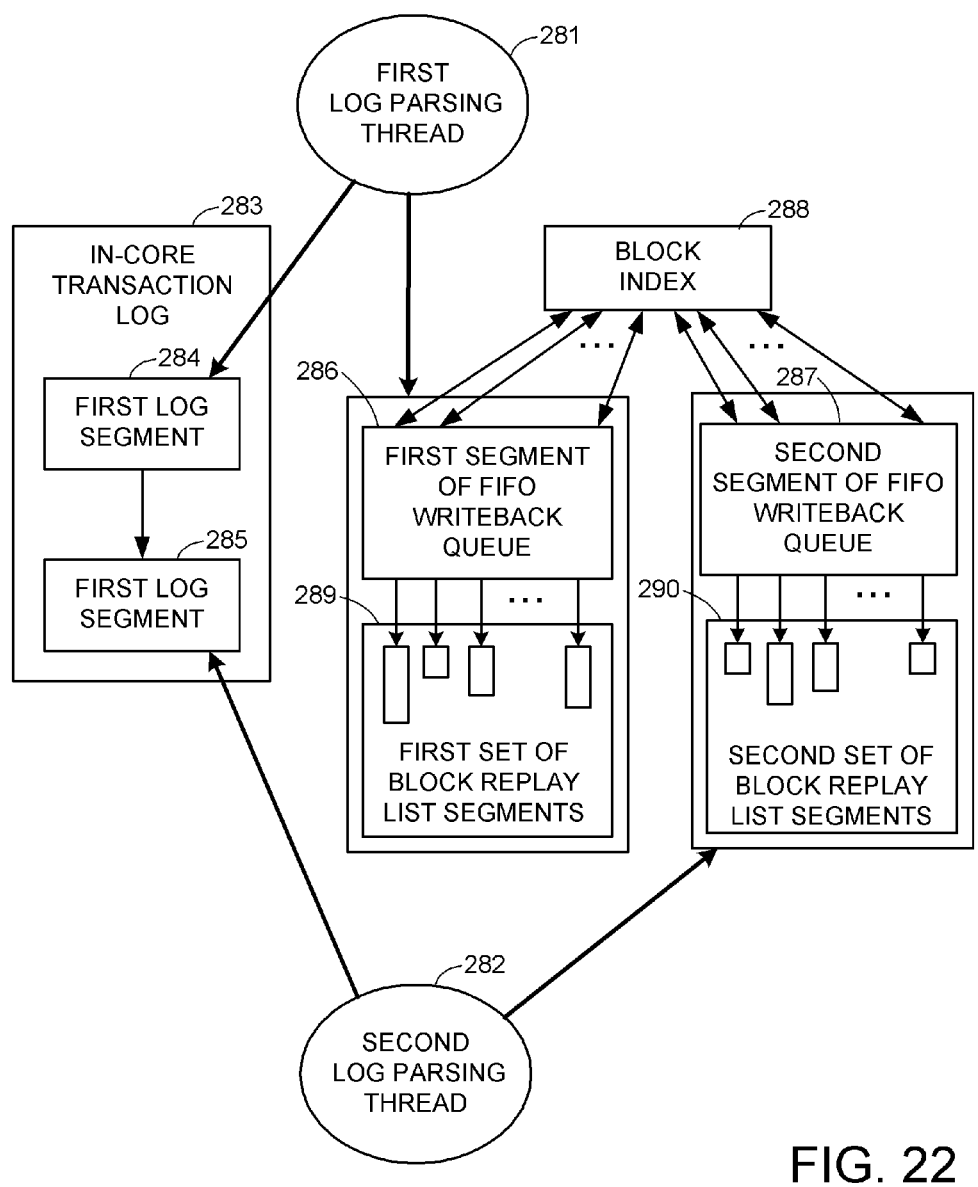
FIG. 22 is a block diagram showing details of data structures in the embodiment of FIG. 12 for using two log parsing threads.

FIG. 22 shows data structures in the embodiment of FIG. 12 for using two log parsing threads 281, 282. A first log parsing thread 281 is assigned a task of parsing a first half of the active log records in the on-disk log to produce a first segment 284 of the in-core transaction log, and a second log parsing thread 282 is assigned the task of parsing a second half of the active log records in the on-disk queue to produce a second segment 284 of the in-core transaction log. The first log parsing thread 281 also produces a first segment 286 of the FIFO writeback queue, and a first set 289 of block replay list segments. The second log parsing thread 282 also produces a second segment 287 of the FIFO writeback queue. Each entry of the first segment 286 of the FIFO writeback queue 286 is linked bi-directionally to the block index 288, and each entry of the second segment 287 of the FIFO writeback queue is also linked bi-directionally to the to the block index 288.

The first log parsing thread 281 produces the first segment 286 of the FIFO writeback queue and handles it as a separate FIFO queue while placing on it block replay lists of the dataset blocks that it finds are modified by transactions in the first half of the on-disk transaction log. In a similar fashion, the second log parsing thread 282 produces the second segment 287 of the FIFO writeback queue and handles it as a separate FIFO queue while placing on it block replay lists of the dataset blocks that it finds are modified by transactions in the second half of the on-disk transaction log. Therefore the block replay list for any given block may comprise a first list segment in the first set 289 and depending from a particular entry of the first segment 286 of the FIFO writeback queue, followed by a second list segment in the second set 290 and depending from a particular entry of the second segment 287 of the FIFO writeback queue.

A replay thread can replay such a block replay list having such a first list segment and a second list segment when being assigned an entry at the head of the FIFO writeback queue by first replaying the first list segment depending from the assigned FIFO writeback queue entry, and then following the link from the assigned FIFO writeback queue entry to the block index 288 to find a link to an entry in the second segment 287 of the FIFO writeback queue to replay the second list segment for the block replay list of the same block. Then the replay thread "cleans up" the writeback queue by removing the entry in the second segment 287 of the FIFO writeback queue. In this fashion, the later duplicate entry in the writeback queue for the block to be restored is removed from the FIFO writeback queue before the block is written back to storage by any writeback thread. For any such duplicate entry, the block index 288 has, for such a block, one block state, a first pointer to the first queue segment 286, and a second pointer to the second queue segment 287.

Figure 23:
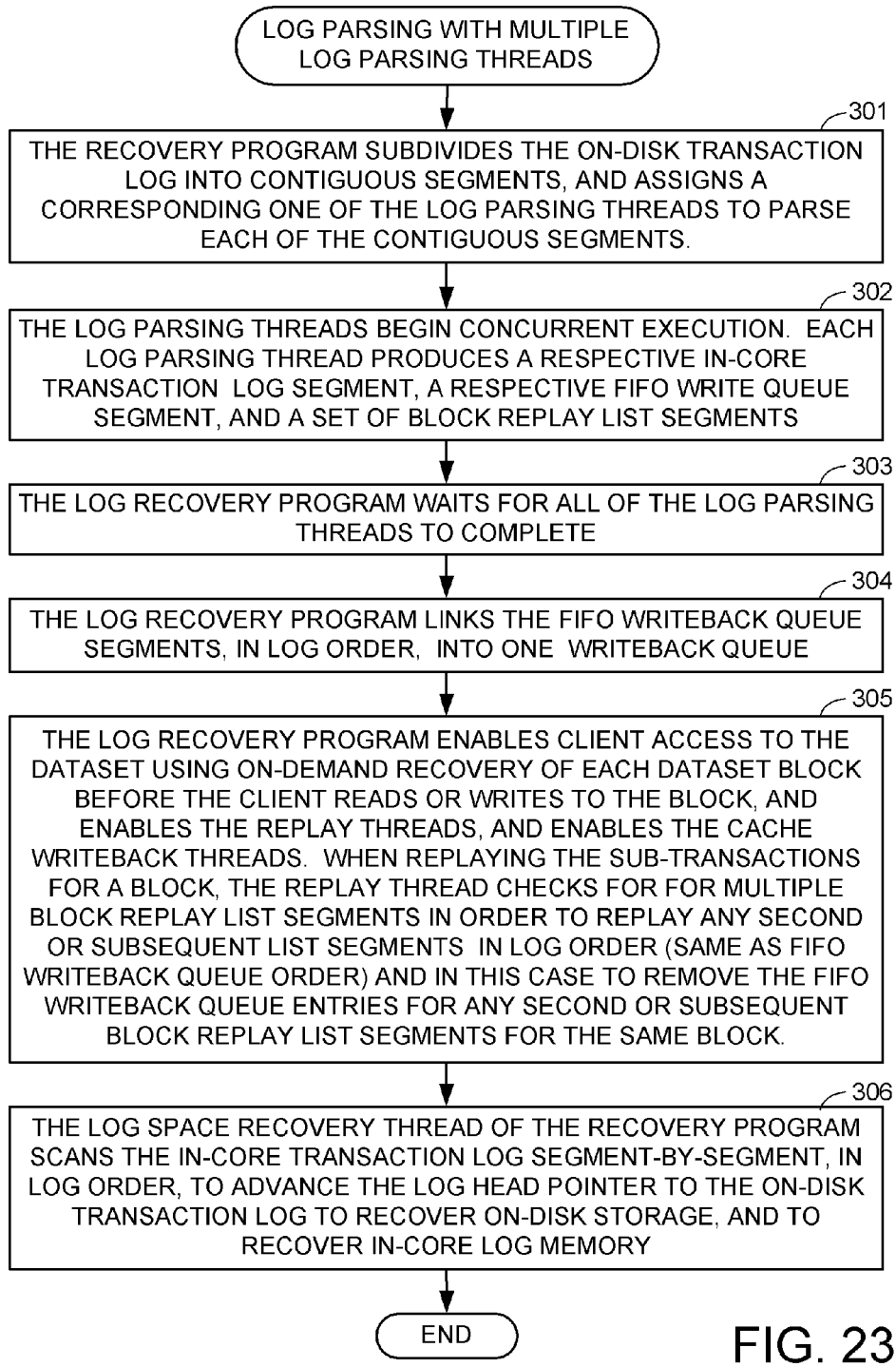
FIG. 23 is a flowchart of a recovery program using multiple log parsing threads.

FIG. 23 show a flowchart of a recovery program using multiple log parsing threads. This flowchart provides details for the steps that involve the use of the multiple log parsing threads and does not repeat other details shown in the recovery program of FIGS. 13 and 14 and discussed above. In a first step 301, the recovery program subdivides the on-disk transaction log into contiguous segments, and assigns a corresponding one of the log parsing threads to parse each of the contiguous segments. Thus, the number of concurrently executed log parsing threads is equal to the number of contiguous segments of the log. Next, in step 302, the log parsing threads begin concurrent execution. Each log parsing thread produces a respective in-core transaction log segment, a respective FIFO write queue segment, and a set of block replay list segments linked to its respective FIFO write queue segment. Then, in step 303, the log recovery program waits for all of the log parsing threads to complete their execution.

Then, in step 304, the log recovery program links the FIFO writeback queue segments, in log order, into one writeback queue. In other words, the "pointer to next" in the last entry of the first segment of the FIFO writeback queue is set to point to the first entry of the second segment of the FIFO writeback queue, and if there are more than two segments then the "pointer to next" in the last entry of the second segment is set to point to the first entry of the third segment of the FIFO writeback queue, etc. Then, in step 305, the log recovery program enables client access to the dataset using on-demand recovery of each dataset block before the client reads or writes to the block, and enables the replay threads, and enables the cache writeback threads. When replaying the sub-transactions for a block, the replay thread checks for multiple block replay list segments in order to replay any second or subsequent list segment in log order (which is the same as the FIFO writeback queue order), and in this case to remove the FIFO writeback queue entries for any second or subsequent block replay list segment for the same block.

Finally, in step 306, the log space recovery thread of the recovery program scans the in-core transaction log segment-by-segment, in log order, to advance the log head pointer of the on-disk transaction log to recover on-disk log storage space, and to recover in-core log memory space.

In view of the above, there has been described a way of recovering a dataset after a server crash while the dataset is used for servicing client requests. In response to a reboot, records of not-yet-completed transactions in a transaction log are parsed to create, for each of the data blocks modified by the not-yet-completed transactions, a respective block replay list of the not-yet-completed transactions that modify the data block. Once the block replay lists have been created, clients may access specified blocks of the dataset after on-demand recovery of the specified blocks. The on-demand recovery is concurrent with a background recovery task that replays the block replay lists. Recovery is completed once all of the block replay lists have been replayed. Replay of the block replay list of a block performs the modifications of the transactions on the replay list upon the block, in the order of the transactions on the replay list, which is the same as the order in which the transactions appear in the transaction log.

To accelerate recovery of log space, the parsing of the log inserts each block replay lists into a first-in first-out queue when the list is created, and the queue is serviced by multiple replay threads. For example, the queue is also used as a cache writeback queue, and a cache index is used for lookup of the replay list and the recovery state of a given block. The recovery state is accessed so that each replay list is replayed just once. To further accelerate log space recovery, each transaction is parsed into one or more sub-transaction so that each sub-transaction specifies the modifications of the transaction upon a single block, and a respective log hold is set for each sub-transaction, and upon recovery of a block, the block replay list for the block is used again for releasing the respective log holds for the sub-transactions for the block. Therefore the log head pointer is advanced to the next transaction on the log to release log space once all of the log holds for the oldest transaction have been released.

What is claimed is:

1. A method of recovery of a dataset in response to reboot of a data processor of a data storage system, the data storage system having data storage storing the dataset and a log of records of transactions upon the dataset, said method comprising the data processor executing computer instructions stored on a non-transitory computer readable storage medium to perform the steps of:
   (a) parsing records in the log of transactions not-yet-completed by the time of the reboot in order to produce a data structure identifying dependencies between the not-yet-completed transactions; and then
   (b) performing a background task of replay of the not-yet-completed transactions in order to recover the dataset, and concurrent with the background task of replay of the not-yet-completed transactions in order to recover the dataset, responding to a request from a client for access to a specified block of data in the dataset by performing on-demand recovery of the specified block and then performing client access to the recovered specified block, and the on-demand recovery of the specified block accessing the data structure identifying dependencies between the not-yet-completed transactions in order to recover the specified block.

2. The method as claimed in claim 1, wherein the transactions upon the dataset include modifications upon data blocks of the dataset, and the data structure includes, for each of the data blocks modified by the not-yet-completed transactions, a respective block replay list of the not-yet-completed transactions that modify said each of the data blocks, the respective block replay list having a time order sequence of the not-yet-completed transactions that modify said each of the data blocks, and
   the background task of replay of the not-yet-completed transactions in order to recover the dataset includes replay of transactions on the block replay lists upon the respective blocks of the block replay lists, and
   the on-demand recovery of the specified block accessing a respective block replay list for the specified block in order to replay the not-yet-completed transactions on the respective block replay list for the specified block upon the specified block.

3. The method as claimed in claim 2, wherein the parsing of the records in the log of transactions not-yet-completed by the time of the reboot includes truncating at least one of the block replay lists of a respective one of the data blocks upon finding that the respective one of the data blocks is completely determined by one of the not-yet-completed transactions, said at least one of the block replay lists being truncated so that said at least one of the block replay lists does not include not-yet-completed transactions that modify the respective one of the data blocks and that occur prior to the not-yet-completed transaction that completely determines the respective one of the data blocks.

4. The method as claimed in claim 2, wherein the parsing of records in the log of transactions not-yet-completed by the time of the reboot includes producing a first-in first-out (FIFO) queue of the block replay lists, so that the block replay lists appear in the FIFO queue in an order in which the respective blocks of the block replay lists are first modified by the not-yet-completed transactions in the transaction log, and wherein the background task of replay of the not-yet-completed transactions includes servicing the FIFO queue to replay transactions on the block replay lists upon the respective blocks of the block replay lists.

5. The method as claimed in claim 4, wherein the servicing of the FIFO queue to replay transactions on the block replay lists upon the respective blocks of the block replay lists includes servicing the FIFO queue with a plurality of concurrently executed replay threads so that each of the concurrently executed replay threads replays transactions on a different respective one of the block replay lists on the FIFO queue.

6. The method as claimed in claim 4, wherein the parsing of records in the log of transactions not-yet-completed by the time of the reboot includes concurrently executing a plurality of concurrent log parsing threads to parse respective segments of the log of transactions not-yet-completed by the time of the reboot, each of the concurrently executed log parsing threads producing a respective segment of the FIFO queue and a respective set of segments of the block replay lists.

7. The method as claimed in claim 4, which further includes using the FIFO queue as a writeback queue for a cache memory by inserting entries on the FIFO queue for new data blocks of client write requests upon the dataset and servicing the entries on the FIFO queue with at least one writeback thread for writeback of the new data blocks of the client write requests from the dataset cache to the dataset in the data storage.

8. The method as claimed in claim 7, which further includes storing, in a block index for the cache memory, block recovery state as well as cache memory state for each of the data blocks modified by the not-yet-completed transactions, and accessing the block index to find a specified one of the data blocks modified by the not-yet-completed transactions in the cache memory and to find the block replay list for the specified block and to find the FIFO queue entry for the specified block and to find the block recovery state and the cache state for the specified block.

9. The method as claimed in claim 2, wherein the parsing of records in the log of transactions not-yet-completed by the time of the reboot includes producing a set of sub-transactions for each of the not-yet-completed transactions, each of the sub-transactions specifying a modification to one of the data blocks of the dataset, and placing a corresponding entry for each of the sub-transactions on the replay list for said one of the data blocks of the dataset, and replay of transactions on each of the block replay lists includes execution of the sub-transactions on said each of the block replay lists, and which further includes setting a respective log hold for each of the sub-transactions, and releasing the respective log hold for each of the sub-transactions after execution of said each of the sub-transactions, and recovering log space of the not-yet-completed transactions in response to release of the log holds of the not-yet-completed transactions.

10. The method as claimed in claim 9, wherein the parsing of records in the log of transactions not-yet-completed by the time of the reboot includes producing implicit sub-transactions for some of the not-yet-completed transactions, the implicit sub-transactions including sub-transactions that are not explicit in said some of the not-yet-completed transactions.

11. The method as claimed in claim 9, which further includes setting a respective log hold for each of the sub-transactions, and releasing the respective log hold for said each of the sub-transactions after execution of said each of the sub-transactions, and recovering log space of the not-yet-completed transactions in response to release of the log holds of the not-yet-completed transactions.

12. The method as claimed in claim 11, which includes scanning each of the block replay lists a first time to recover the respective data block of said each of the block replay lists by reading the respective data block from the dataset in the data storage and writing the respective data block to memory, performing each of the sub-transactions on said each of the block replay lists upon the respective data block in memory, and writing the respective data block from memory back to the dataset in the data storage, and then scanning said each of the block replay lists a second time to release the log holds for the sub-transactions on said each of the block replay lists.

13. A method of recovery of a dataset in response to reboot of a data processor of a data storage system, the data storage system having data storage storing the dataset and a log of records of transactions upon the dataset, the transactions upon the dataset including modifications upon data blocks of the dataset, said method comprising the data processor executing computer instructions stored on non-transitory computer readable storage medium to perform the steps of:
(a) parsing records in the log of transactions not-yet-completed by the time of the reboot in order to create, for each of the data blocks modified by the not-yet-completed transactions, a respective block replay list of the not-yet-completed transactions that modify said each of the data blocks, and then
(b) performing a background task of replay of the not-yet-completed transactions by replay of transactions on the block replay lists upon the respective blocks of the block replay lists, and concurrent with the background task of replay of the not-yet-completed transactions on the block replay lists upon the respective blocks of the block replay lists, responding to a request from a client for access to a specified block of data in the dataset by performing on-demand recovery of the specified block and then performing client access to the recovered specified block, and the on-demand recovery of the specified block accessing a respective block replay list for the specified block in order to replay the not-yet-completed transactions on the respective block replay list for the specified block upon the specified block;
wherein the parsing of records in the log of transactions not-yet-completed by the time of the reboot includes producing a first-in first-out (FIFO) queue of the block replay lists, so that the block replay lists appear in the FIFO queue in an order in which the respective blocks of the block replay lists are first modified by the not-yet-completed transactions in the transaction log, and wherein the background task of replay of the not-yet-completed transactions includes servicing the FIFO queue to replay the transactions on the block replay lists upon the respective blocks of the block replay lists;
wherein the servicing of the FIFO queue to replay transactions on the block replay lists upon the respective blocks of the block replay lists includes servicing the FIFO queue with a plurality of concurrently executed replay threads so that each of the concurrently executed replay threads replays transactions on a different respective one of the block replay lists on the FIFO queue;
which further includes using the FIFO queue as a write-back queue for a cache memory by inserting entries on the FIFO queue for new data blocks of client write requests upon the dataset and servicing the entries on the FIFO queue with at least one writeback thread for writeback of the new data blocks of the client write requests from the dataset cache to the dataset in the data storage;
which further includes storing, in a block index for the cache memory, block recovery state as well as cache memory state for each of the data blocks modified by the not-yet-completed transactions, and accessing the block index to find a specified one of the data blocks modified by the not-yet-completed transactions in the cache memory and to find the block replay list for the specified block and to find the FIFO queue entry for the specified block and to find the block recovery state and the cache state for the specified block;
wherein the parsing of records in the log of transactions not-yet-completed by the time of the reboot includes producing a set of sub-transactions for each of the not-yet-completed transactions, each of the sub-transactions specifying a modification to one of the data blocks of the dataset, and placing a corresponding entry for each of the sub-transactions on the replay list for said one of the data blocks of the dataset, and replay of transactions on each of the block replay lists includes execution of the sub-transactions on said each of the block replay lists, and
which further includes setting a respective log hold for each of the sub-transactions, and releasing the respective log hold for each of the sub-transactions after execution of said each of the sub-transactions, and recovering log space of the not-yet-completed transactions in response to release of the log holds of the not-yet-completed transactions.

14. A data storage system comprising:
data storage storing a dataset and a log of records of transactions upon the dataset;
a data processor coupled to the data storage for providing a client with access to the dataset; and
non-transitory computer readable storage medium coupled to the data processor and storing computer instructions that, when executed by the data processor, perform recovery of the dataset in response to reboot of the data processor by performing the steps of:
(a) parsing records in the log of transactions not-yet-completed by the time of the reboot in order to produce a data structure identifying dependencies between the not-yet-completed transactions; and then
(b) performing a background task of replay of the not-yet-completed transactions in order to recover the dataset, and concurrent with the background task of replay of the not-yet-completed transactions in order to recover the dataset, responding to a request from a client for access to a specified block of data in the dataset by performing on-demand recovery of the specified block and then performing client access to the recovered specified block, and the on-demand recovery of the specified block accessing the data structure identifying dependencies between the not-yet-completed transactions in order to recover the specified block.

15. The data storage system as claimed in claim 14, wherein the transactions upon the dataset include modifications upon data blocks of the dataset, and the data structure includes, for each of the data blocks modified by the not-yet-completed transactions, a respective block replay list of the not-yet-completed transactions that modify said each of the data blocks, the respective block replay list having a time order sequence of the not-yet-completed transactions that modify said each of the data blocks, and the background task of replay of the not-yet-completed transactions in order to recover the dataset includes replay of transactions on the block replay lists upon the respective blocks of the block replay lists, and the on-demand recovery of the specified block accessing a respective block replay list for the specified block in order to replay the not-yet-completed transactions on the respective block replay list for the specified block upon the specified block.

16. The data storage system as claimed in claim 15, wherein the parsing of records in the log of transactions not-yet-completed by the time of the reboot includes truncating at least one of the block replay lists of a respective one of the data blocks upon finding that the respective one of the data blocks is completely determined by one of the not-yet-completed transactions, said at least one of the block replay lists being truncated so that said at least one of the block replay lists does not include not-yet-completed transactions that modify the respective one of the data blocks and that occur prior to the not-yet-completed transaction that completely determines the respective one of the data blocks.

17. The data storage system as claimed in claim 15, wherein the parsing of records in the log of transactions not-yet-completed by the time of the reboot includes producing a first-in first-out (FIFO) queue of the block replay lists, so that the block replay lists appear in the FIFO queue in an order in which the respective blocks of the block replay lists are first modified by the not-yet-completed transactions in the transaction log, and wherein the background task of replay of the not-yet-completed transactions includes servicing the FIFO queue to replay transactions on the block replay lists upon the respective blocks of the block replay lists.

18. The data storage system as claimed in claim 17, wherein the servicing of the FIFO queue to replay transactions on the block replay lists upon the respective blocks of the block replay lists includes servicing the FIFO queue with a plurality of concurrently executed replay threads so that each of the concurrently executed replay threads replays transactions on a different respective one of the block replay lists on the FIFO queue.

19. The data storage system as claimed in claim 17, wherein the parsing of records in the log of transactions not-yet-completed by the time of the reboot includes concurrently executing a plurality of concurrent log parsing threads to parse respective segments of the log of transactions not-yet-completed by the time of the reboot, each of the concurrently executed log parsing threads producing a respective segment of the FIFO queue and a respective set of segments of the block replay lists.

20. The data storage system as claimed in claim 15, wherein the parsing of records in the log of transactions not-yet-completed by the time of the reboot includes producing a set of sub-transactions for each of the not-yet-completed transactions, each of the sub-transactions specifying a modification to a respective one of the data blocks of the dataset, and placing a corresponding entry for each of the sub-transactions on the replay list for the respective one of the data blocks of the dataset, and replay of transactions on each of the block replay lists includes execution of the sub-transactions on said each of the block replay lists, and which further includes setting a respective log hold for each of the sub-transactions, and releasing the respective log hold for each of the sub-transactions after execution of said each of the sub-transactions, and recovering log space of the not-yet-completed transactions in response to release of the log holds of the not-yet-completed transactions.

\* \* \* \* \*